(12) United States Patent
Tian et al.

(10) Patent No.: US 11,902,972 B2
(45) Date of Patent: Feb. 13, 2024

(54) CONFLICTING PHYSICAL DOWNLINK SHARED CHANNEL (PDSCH) TRANSMISSION ASSOCIATED WITH A MULTI-PDSCH SEMI-PERSISTENT SCHEDULING

(71) Applicant: QUALCOMM Incorporated, San Diego, CA (US)

(72) Inventors: Qingjiang Tian, San Diego, CA (US); Mostafa Khoshnevisan, San Diego, CA (US); Jing Sun, San Diego, CA (US); Olufunmilola Omolade Awoniyi-Oteri, San Diego, CA (US); Wooseok Nam, San Diego, CA (US); Ahmed Abdelaziz Ibrahim Abdelaziz Zewail, San Diego, CA (US); Zhifei Fan, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/448,414

(22) Filed: Sep. 22, 2021

(65) Prior Publication Data
US 2023/0088959 A1    Mar. 23, 2023

(51) Int. Cl.
*H04W 72/1273*    (2023.01)
*H04W 72/1263*    (2023.01)

(52) U.S. Cl.
CPC .............................. *H04W 72/1273* (2013.01)

(58) Field of Classification Search
CPC .......... H04W 72/1273; H04W 72/1263; H04L 5/0044; H04L 5/0053
See application file for complete search history.

(56) References Cited

U.S. PATENT DOCUMENTS

| | | | |
|---|---|---|---|
| 2018/0049193 A1* | 2/2018 | Belleschi | H04W 72/0446 |
| 2020/0068595 A1* | 2/2020 | Dinan | H04W 4/44 |

(Continued)

OTHER PUBLICATIONS

CATT: "Remaining Issues on IIoT", 3GPP Draft, 3GPP TSG RAN WG1 Meeting #100bis, R1-2002088, 3rd Generation Partnership Project (3GPP), Mobile Competence Centre, 650, Route Des Lucioles, F-06921 Sophia-Antipolis Cedex, France, vol. RAN WG1, No. Online Meeting, 20200420-20200430, Apr. 11, 2020 (Apr. 11, 2020), XP051875445, 9 Pages, Section 2.2, p. 4-p. 5, figure 2, figures 1-3, Section 1-4.

(Continued)

*Primary Examiner* — Kent Krueger
(74) *Attorney, Agent, or Firm* — Harrity & Harrity, LLP

(57) ABSTRACT

Various aspects of the present disclosure generally relate to wireless communication. In some aspects, a user equipment (UE) may detect a physical downlink shared channel (PDSCH) transmission associated with a multi-PDSCH semi-persistent scheduling (SPS) that potentially conflicts with a second transmission in a slot. The UE may determine to keep at least one of the PDSCH transmission associated with the multi-PDSCH SPS or the second transmission in the slot based at least in part on one or more rules. The UE may perform, with a base station in the slot, at least one of the PDSCH transmission associated with the multi-PDSCH SPS or the second transmission that is kept based at least in part on the one or more rules. Numerous other aspects are described.

30 Claims, 12 Drawing Sheets

(56) References Cited

U.S. PATENT DOCUMENTS

| | | | | |
|---|---|---|---|---|
| 2021/0352694 A1* | 11/2021 | Saber | | H04B 7/024 |
| 2022/0030615 A1* | 1/2022 | Saber | | H04L 5/0053 |
| 2022/0271873 A1* | 8/2022 | Gao | | H04L 1/1887 |
| 2022/0278779 A1* | 9/2022 | Mu | | H04L 1/1896 |
| 2022/0322375 A1* | 10/2022 | Huang | | H04W 72/51 |
| 2022/0353021 A1* | 11/2022 | Park | | H04W 72/53 |
| 2023/0076459 A1* | 3/2023 | Si | | H04W 72/1273 |
| 2023/0170969 A1* | 6/2023 | Kim | | H04W 72/1268 |
| | | | | 375/267 |

OTHER PUBLICATIONS

International Search Report and Written Opinion—PCT/US2022/074327—ISA/EPO—dated Nov. 18, 2022.

Moderator (LG Electronics): "Summary #2 on Maintenance of Other Aspects for URLLC/IIOT", 3GPP Draft, 3GPP TSG RAN WG1 #100bis, R1-2002721, 3rd Generation Partnership Project (3GPP), Mobile Competence Centre, 650, Route Des Lucioles, F-06921 Sophia-Antipolis Cedex, France, vol. RAN WG1, No. e-Meeting, 20200420-20200430, Apr. 18, 2020 (Apr. 18, 2020), XP051876676, 31 Pages, Section 3.2.1, Sections 1-6.

Wilus Inc: "Remaining Issues on DL SPS for NR URLLC", 3GPP TSG RAN WG1 #100bis, 3GPP Draft, R1-2002638, 3rd Generation Partnership Project (3GPP), Mobile Competence Centre, 650, Route Des Lucioles, F-06921 Sophia-Antipolis Cedex, France, vol. RAN WG1, No. e-Meeting, 20200420-20200430, Apr. 11, 2020 (Apr. 11, 2020), 4 Pages, XP051875730, Section 2, Figures 1-3, Sections 1-3.

\* cited by examiner

CONFLICTING PHYSICAL DOWNLINK SHARED CHANNEL (PDSCH) TRANSMISSION ASSOCIATED WITH A MULTI-PDSCH SEMI-PERSISTENT SCHEDULING

FIELD OF THE DISCLOSURE

Aspects of the present disclosure generally relate to wireless communication and to techniques and apparatuses for a potentially conflicting physical downlink shared channel (PDSCH) transmission associated with a multi-PDSCH semi-persistent scheduling (SPS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: detect a physical downlink shared channel (PDSCH) transmission associated with a multi-PDSCH semi-persistent scheduling (SPS) that potentially conflicts with a second transmission in a slot; determine to keep at least one of the PDSCH transmission associated with the multi-PDSCH SPS or the second transmission in the slot based at least in part on one or more rules; and perform, with a base station in the slot, at least one of the PDSCH transmission associated with the multi-PDSCH SPS or the second transmission that is kept based at least in part on the one or more rules.

In some implementations, a method of wireless communication performed by a UE includes detecting a PDSCH transmission associated with a multi-PDSCH SPS that potentially conflicts with a second transmission in a slot; determining to keep at least one of the PDSCH transmission associated with the multi-PDSCH SPS or the second transmission in the slot based at least in part on one or more rules; and performing, with a base station in the slot, at least one of the PDSCH transmission associated with the multi-PDSCH SPS or the second transmission that is kept based at least in part on the one or more rules.

In some implementations, a non-transitory computer-readable medium storing a set of instructions for wireless communication includes one or more instructions that, when executed by one or more processors of a UE, cause the UE to: detect a PDSCH transmission associated with a multi-PDSCH SPS that potentially conflicts with a second transmission in a slot; determine to keep at least one of the PDSCH transmission associated with the multi-PDSCH SPS or the second transmission in the slot based at least in part on one or more rules; and perform, with a base station in the slot, at least one of the PDSCH transmission associated with the multi-PDSCH SPS or the second transmission that is kept based at least in part on the one or more rules.

In some implementations, an apparatus for wireless communication includes means for detecting a PDSCH transmission associated with a multi-PDSCH SPS that potentially conflicts with a second transmission in a slot; means for determining to keep at least one of the PDSCH transmission associated with the multi-PDSCH SPS or the second transmission in the slot based at least in part on one or more rules; and means for performing, with a base station in the slot, at least one of the PDSCH transmission associated with the multi-PDSCH SPS or the second transmission that is kept based at least in part on the one or more rules.

In some implementations, an apparatus for wireless communication at a base station includes a memory and one or more processors, coupled to the memory, configured to: detect a physical downlink shared channel (PDSCH) transmission associated with a multi-PDSCH semi-persistent scheduling (SPS) that potentially conflicts with a second transmission in a slot; determine to keep at least one of the PDSCH transmission associated with the multi-PDSCH SPS or the second transmission in the slot based at least in part on one or more rules; and perform, with a UE in the slot, at least one of the PDSCH transmission associated with the multi-PDSCH SPS or the second transmission that is kept based at least in part on the one or more rules.

In some implementations, a method of wireless communication performed by a base station includes detecting a PDSCH transmission associated with a multi-PDSCH SPS that potentially conflicts with a second transmission in a slot; determining to keep at least one of the PDSCH transmission associated with the multi-PDSCH SPS or the second transmission in the slot based at least in part on one or more rules; and performing, with a UE in the slot, at least one of the PDSCH transmission associated with the multi-PDSCH SPS or the second transmission that is kept based at least in part on the one or more rules.

In some implementations, a non-transitory computer-readable medium storing a set of instructions for wireless communication includes one or more instructions that, when executed by one or more processors of a base station, cause the base station to: detect a PDSCH transmission associated with a multi-PDSCH SPS that potentially conflicts with a second transmission in a slot; determine to keep at least one of the PDSCH transmission associated with the multi-PDSCH SPS or the second transmission in the slot based at least in part on one or more rules; and perform, with a UE in the slot, at least one of the PDSCH transmission associated with the multi-PDSCH SPS or the second transmission that is kept based at least in part on the one or more rules.

In some implementations, an apparatus for wireless communication includes means for detecting a PDSCH transmission associated with a multi-PDSCH SPS that potentially conflicts with a second transmission in a slot; means for determining to keep at least one of the PDSCH transmission associated with the multi-PDSCH SPS or the second transmission in the slot based at least in part on one or more rules; and means for performing, with a UE in the slot, at least one of the PDSCH transmission associated with the multi-PDSCH SPS or the second transmission that is kept based at least in part on the one or more rules.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
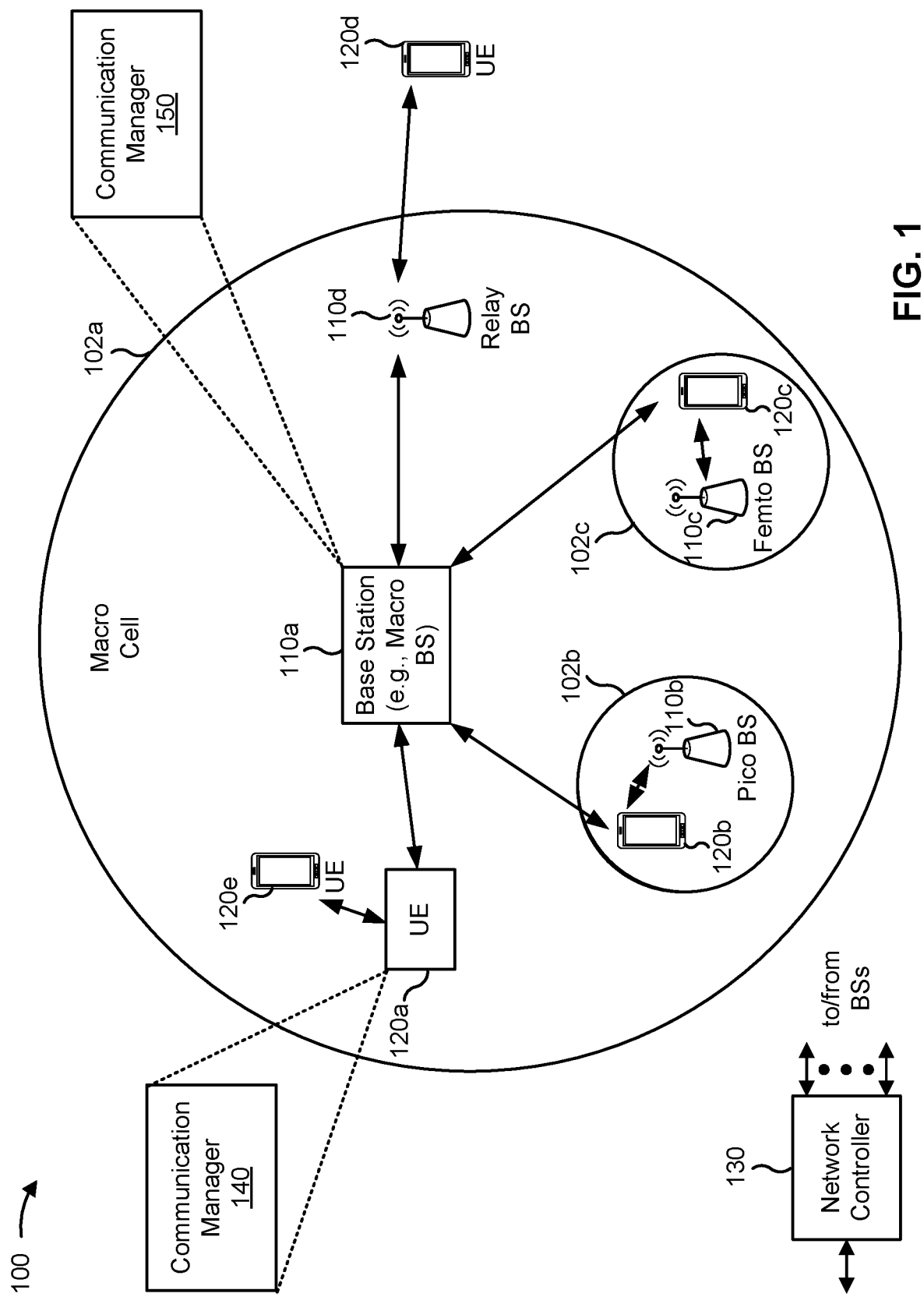
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 52.6 GHz-71 GHz (FR2-2), 71 GHz-114.25 GHz (e.g., FR4), and 114.25 GHz-300 GHz (e.g., FR5). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR2-2, and/or FR5) may be modified, and techniques described herein are applicable to those modified frequency ranges.

In some aspects, a UE (e.g., UE 120) may include a communication manager 140. As described in more detail elsewhere herein, the communication manager 140 may detect a physical downlink shared channel (PDSCH) transmission associated with a multi-PDSCH semi-persistent scheduling (SPS) that potentially conflicts with a second transmission in a slot; determine to keep at least one of the PDSCH transmission associated with the multi-PDSCH SPS or the second transmission in the slot based at least in part on one or more rules; and perform, with a base station in the slot, at least one of the PDSCH transmission associated with the multi-PDSCH SPS or the second transmission that is kept based at least in part on the one or more rules. Additionally, or alternatively, the communication manager 140 may perform one or more other operations described herein.

In some aspects, a base station (e.g., base station 110) may include a communication manager 150. As described in more detail elsewhere herein, the communication manager 150 may detect a PDSCH transmission associated with a multi-PDSCH SPS that potentially conflicts with a second transmission in a slot; determine to keep at least one of the PDSCH transmission associated with the multi-PDSCH SPS or the second transmission in the slot based at least in part on one or more rules; and perform, with a UE in the slot, at least one of the PDSCH transmission associated with the multi-PDSCH SPS or the second transmission that is kept based at least in part on the one or more rules. Additionally, or alternatively, the communication manager 150 may perform one or more other operations described herein.

As indicated above, FIG. 1 is provided as an example. Other examples may differ from what is described with regard to FIG. 1.

Figure 2:
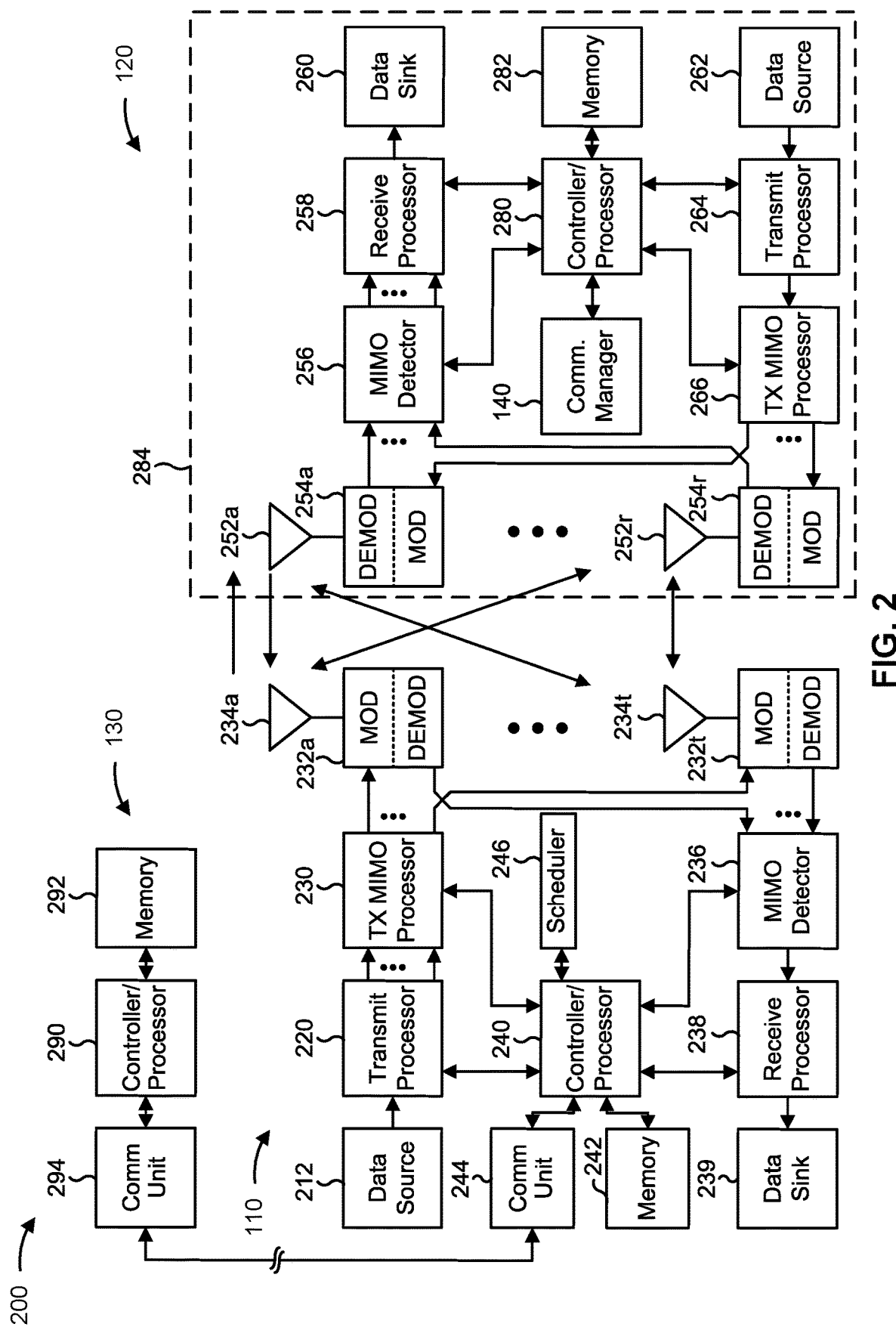
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with a potentially conflicting PDSCH transmission associated with a multi-PDSCH SPS, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some examples, executing instructions may include running the instructions, converting the instructions, compiling the instructions, and/or interpreting the instructions, among other examples.

In some aspects, a UE (e.g., UE 120) includes means for detecting a PDSCH transmission associated with a multi-PDSCH SPS that potentially conflicts with a second transmission in a slot; means for determining to keep at least one of the PDSCH transmission associated with the multi-PDSCH SPS or the second transmission in the slot based at least in part on one or more rules; and/or means for performing, with a base station in the slot, at least one of the PDSCH transmission associated with the multi-PDSCH SPS or the second transmission that is kept based at least in part on the one or more rules. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for detecting a PDSCH transmission associated with a multi-PDSCH SPS that potentially conflicts with a second transmission in a slot; means for determining to keep at least one of the PDSCH transmission associated with the multi-PDSCH SPS or the second transmission in the slot based at least in part on one or more rules; and/or means for performing, with a base station in the slot, at least one of the PDSCH transmission associated with the multi-PDSCH SPS or the second transmission that is kept based at least in part on the one or more rules. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

For FR4, which may range from approximately 71 GHz to 114.25 GHz, an available band may be used for fixed use cases (e.g., no/low UE mobility). The fixed use cases may be associated with a fixed point-to-point or a fixed point-to-multi-point. An FR4 NR design may focus on optimizing for no/low UE mobility use cases with a limited number of UEs potentially further away from a base station, such that coverage may be more important than flexibility and UE mobility. For FR4, an effective isotropic radiated power (EIRP) limitation may be relatively high (e.g., up to 85 dBm). The EIRP limitation may be subject to an antenna gain limitation (e.g., the 85 dBm may only be possible if an antenna gain exceeds 55 dB). The EIRP limitation for FR4 may be substantially higher than as compared to an FR2-2 band, which may range from approximately 52.6 GHz to 71 GHz. As a result, for FR4, relatively narrow beams may be needed to provide coverage for UEs.

Multi-physical uplink shared channel (multi-PUSCH) and multi-PDSCH scheduling by single DCI may reduce control overhead. One downlink control information (DCI) may schedule multiple PXSCH transmissions (e.g., PUSCH or PDSCH transmissions). Multiple PXSCH transmissions may share a same MCS and/or frequency domain resource allocation (FDRA) to reduce overhead.

For FR4, which may be associated with fixed point and low mobility, higher propagation loss, and/or relatively stable channel conditions, reducing control overhead and/or increasing coverage may be beneficial.

A multi-PXSCH grant may be a configured grant (CG) or SPS, which may further reduce the overhead. A base station may activate/deactivate a CG/SPS multi-PXSCH scheduling. Multiple CG-PUSCH or SPS-PDSCH configurations may achieve a similar effect but may require numerous activation DCIs. Thus, a benefit of a multi-PXSCH based SPS/CG may be a reduced quantity of activation/deactivation DCIs.

A UE may be configured with more than one SPS, which may be indexed by a different SPS configuration index (sps-ConfigIndex). Different SPSs may have different periodicities and time division resource allocations (TDRAs), such that two SPSs may schedule PDSCH transmissions in a same slot, and these transmissions may overlap with each other in the same slot. The UE may be configured to receive only one of the PDSCH transmissions and transmit feedback for the received PDSCH transmission.

A UE may be configured with multiple SPS single-PDSCHs. When more than one PDSCH transmission on a serving cell, each without a corresponding physical downlink control channel (PDCCH) transmission, are in a slot, after resolving overlapping with symbols in the slot indicated as uplink, the UE may receive one or more PDSCH transmissions without corresponding PDCCH transmissions in the slot. For example, if UE may be capable of receiving only one PDSCH in a single slot, the UE may receive the one PDSCH transmission associated with a lowest configured sps-ConfigIndex, where the received PDSCH transmission may be designated as a survivor PDSCH transmission. In other words, when two PDSCH transmissions are conflicting in the same slot, the PDSCH transmission from the SPS with a lowest sps-ConfigIndex may be kept, while the other PDSCH transmission may be dropped.

Figure 3:
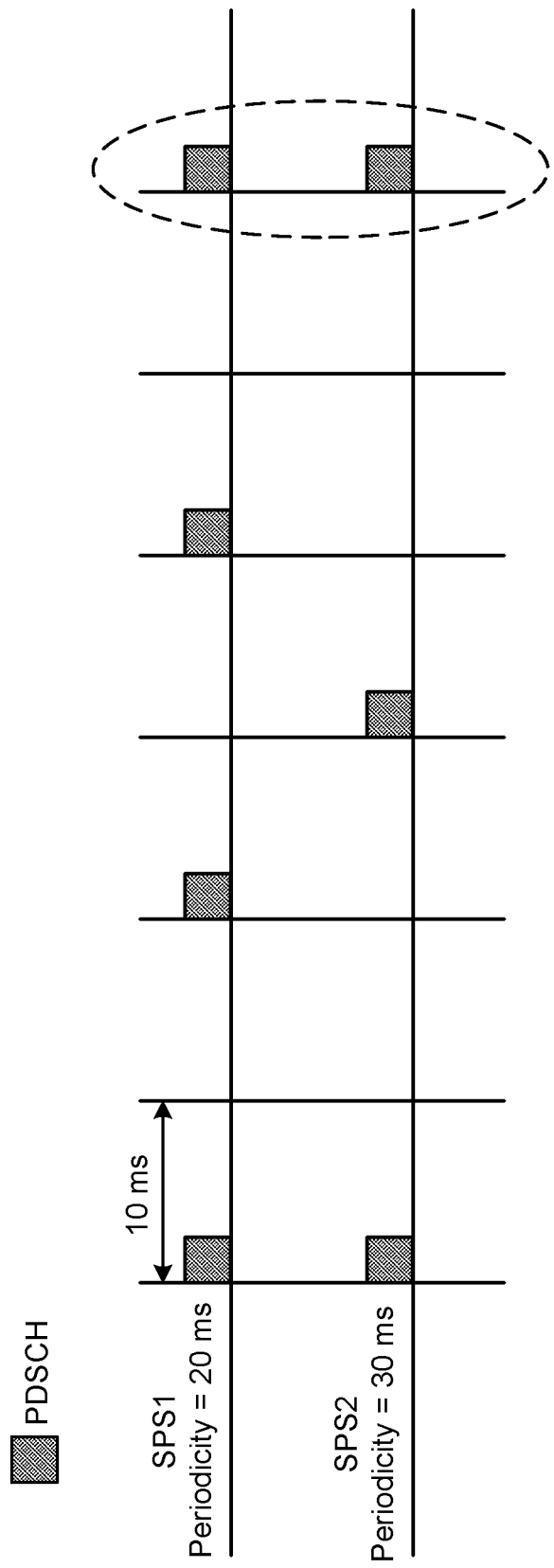
FIG. 3 is a diagram illustrating an example of overlapping physical downlink shared channel (PDSCH) transmissions from single PDSCH semi-persistent schedulings (SPSs), in accordance with the present disclosure.

FIG. 3 is a diagram illustrating an example 300 of conflicting PDSCH transmissions from single PDSCH SPSs, in accordance with the present disclosure.

As shown in FIG. 3, in which drawing may be not to scale, a first SPS (SPS 1) may be associated with a periodicity of 20 ms, and a second SPS (SPS 2) may be associated with a periodicity of 30 ms. The first SPS and the second SPS may be associated with single PDSCH SPSs. In other words, the first SPS and the second SPS may each schedule only a single PDSCH transmission in a given period (20 ms and 30 ms in FIG. 3, respectively). Based at least in part on the periodicity of the first SPS and the periodicity of the second SPS, conflicting PDSCH transmissions associated with the first SPS and the second SPS may occur in a same slot. The conflicting may be due to overlapping in time between the PDSCH transmissions. The conflicting may be due to a UE capability of receiving only one PDSCH in a single slot. The conflicting may be due to insufficient time for transmission configuration indicator (TCI) switching in between PDSCH transmissions. In this case, a PDSCH transmission with an SPS with a lowest sps-ConfigIndex may be kept, while the other conflicting PDSCH transmission in the same slot may be dropped. The PDSCH transmission that is kept may be an actually transmitted PDSCH transmission. Conflicting PDSCH transmissions that are dropped may be non-transmitted PDSCH transmissions (e.g., PDSCH transmissions that are not actually transmitted).

As indicated above, FIG. 3 is provided as an example. Other examples may differ from what is described with regard to FIG. 3.

Figure 4:
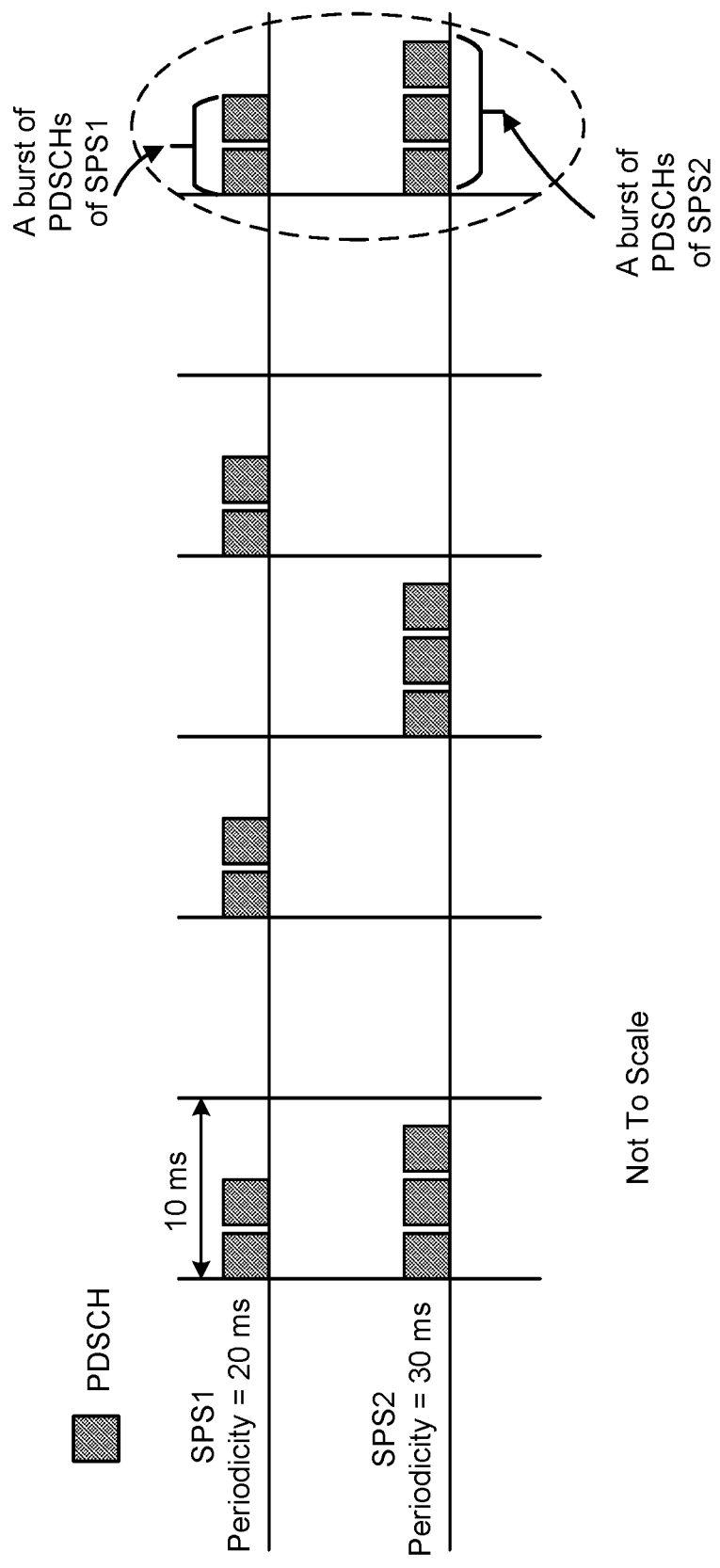
FIG. 4 is a diagram illustrating an example of overlapping PDSCH transmissions from different multi-PDSCH SPSs, in accordance with the present disclosure.

FIG. 4 is a diagram illustrating an example 400 of conflicting PDSCH transmissions from different multi-PDSCH SPSs, in accordance with the present disclosure.

As shown in FIG. 4, a first SPS (SPS 1) may be associated with a periodicity of 20 ms, and a second SPS (SPS 2) may be associated with a periodicity of 30 ms. The first SPS and the second SPS may be associated with multi-PDSCH SPSs. In other words, the first SPS and the second SPS may each schedule multiple PDSCH transmissions occupying multiple slots in a given period (these multiple PDSCH transmissions in the given period may be referred to as a burst of PDSCH transmissions of the SPS). For a multi-PDSCH SPS, a base station may schedule multiple PDSCH transmissions for each period, and these PDSCH transmissions may occupy multiple slots (one slot for each PDSCH transmission), depending on a UE capability and a start and length indicator value (SLIV). As an example, the first SPS may schedule two PDSCH transmissions occupying two slots in a given period (20 ms in FIG. 4), and the second SPS may schedule three PDSCH transmissions occupying three slots in a given period (30 ms in FIG. 4). Based at least in part on the periodicity of the first SPS and the periodicity of the second SPS, PDSCH transmissions associated with the first SPS and the second SPS may occur in a same slot.

In this case, PDSCHs from multi-PDSCH SPSs may occur in a same slot (they may or may not overlap in time). When the UE is capable of receiving only one PDSCH in a single slot, keeping a PDSCH transmission from an SPS with a lowest sps-ConfigIndex may be possible, but may not be ideal. For example, keeping the SPS with the lowest sps-ConfigIndex (e.g., the first SPS) may result in two PDSCH transmissions alive in the burst. On the other hand, keeping the second SPS may result in three PDSCH transmissions alive in the burst. As a result, keeping the SPS with the lowest sps-ConfigIndex may not be suitable for conflicting PDSCH transmissions from multi-PDSCH SPSs.

As indicated above, FIG. 4 is provided as an example. Other examples may differ from what is described with regard to FIG. 4.

In various aspects of techniques and apparatuses described herein, a UE may detect a PDSCH transmission associated with a multi-PDSCH SPS that potentially conflicts with a second transmission in a slot. The PDSCH transmission may potentially conflict with the second transmission based at least in part on an overlapping in time between the PDSCH transmission and the second transmission, a time gap for TCI switching between the PDSCH transmission and the second transmission that satisfies a threshold, and/or a UE capability of receiving one or more PDSCH transmissions in a single slot. The second transmission may be a second PDSCH transmission associated with a second multi-PDSCH SPS. The second transmission may be a dynamically scheduled PDSCH transmission. The second transmission may be associated with static uplink symbols which may be reserved for an uplink transmission. The UE may determine to keep at least one of the PDSCH transmission associated with the multi-PDSCH SPS or the second transmission in the slot based at least in part on one or more rules. The one or more rules may define in which cases the UE should keep the PDSCH transmission associated with the multi-PDSCH SPS, in which cases the UE should keep the second transmission, and in which cases the UE should keep both the PDSCH transmission associated with the multi-PDSCH SPS and the second transmission. The UE may perform, with a base station in the slot, at least one of the PDSCH transmission associated with the multi-PDSCH SPS or the second transmission that is kept based at least in part on the one or more rules. As a result, the UE may handle a conflicting PDSCH associated with the multi-PDSCH SPS.

Figure 5:
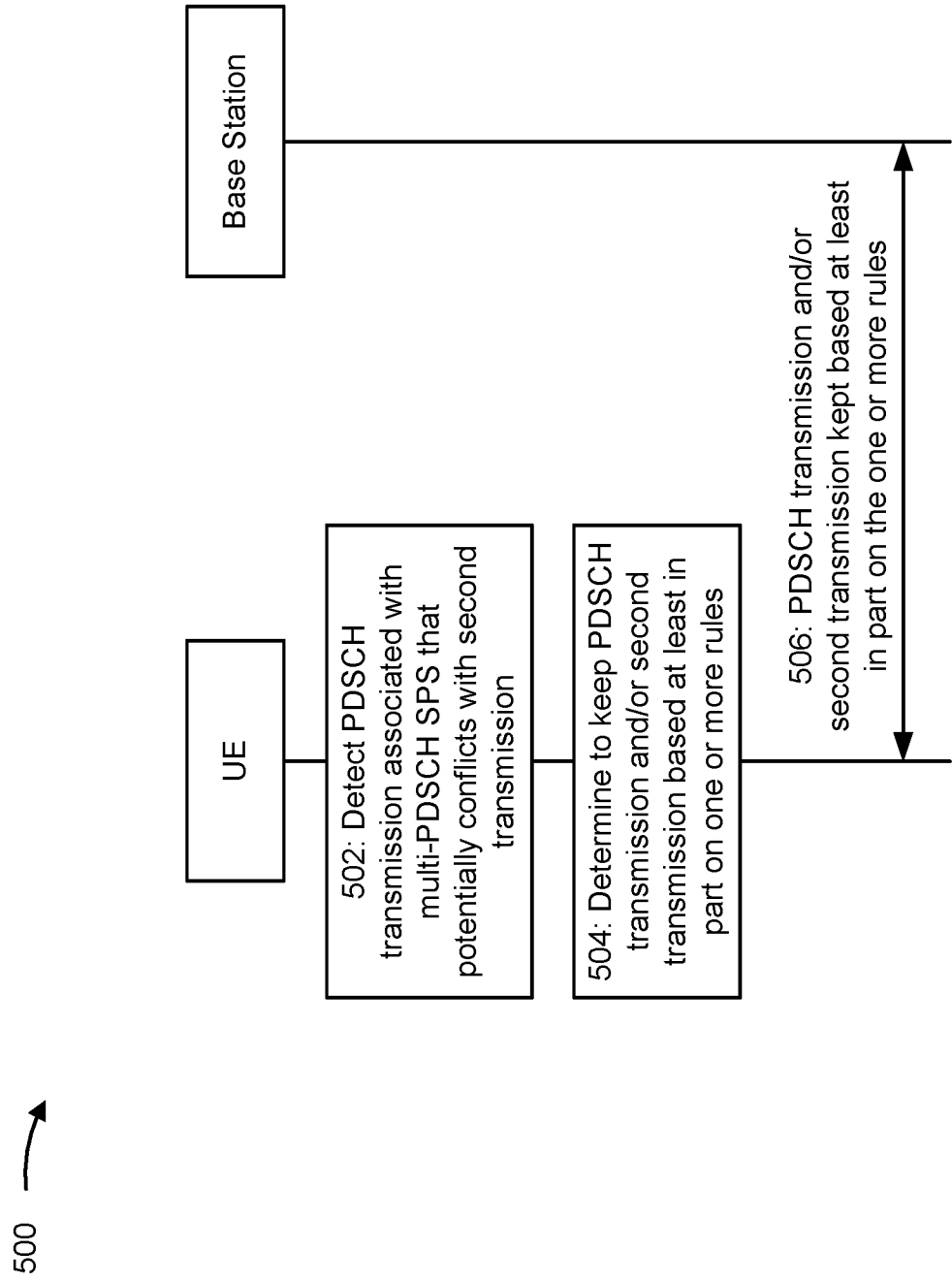
FIG. 5 is a diagram illustrating an example associated with a potentially conflicting PDSCH transmission associated with a multi-PDSCH SPS, in accordance with the present disclosure.

FIG. 5 is a diagram illustrating an example 500 associated with a potentially conflicting PDSCH transmission associated with a multi-PDSCH SPS, in accordance with the present disclosure. As shown in FIG. 5, example 500 includes communication between a UE (e.g., UE 120) and a base station (e.g., base station 110). In some aspects, the UE and the base station may be included in a wireless network, such as wireless network 100.

As shown by reference number 502, the UE may detect a PDSCH transmission associated with a multi-PDSCH SPS that potentially conflicts with a second transmission in a slot. The PDSCH transmission that potentially conflicts with the second transmission may actually conflict with the second transmission when certain conditions are met. The PDSCH transmission that potentially conflicts with the second transmission may not actually conflict with the second transmission when certain conditions are not met. The UE may detect the potential conflict based at least in part on an overlapping in time between the PDSCH transmission and the second transmission. For example, the PDSCH transmission and the second transmission may at least partially overlap in a time domain in a single slot. The PDSCH transmission and the second transmission may overlap in time based at least in part on SLIVs associated with the PDSCH transmission and the second transmission, respectively. The UE may detect the potential conflict based at least in part on a time gap for transmission configuration indicator (TCI) switching between the PDSCH transmission and the second transmission that does not satisfy a threshold (e.g., the time gap allows insufficient time for TCI switching). In this case, the PDSCH transmission and the second transmission may not overlap in time, but an amount of time for TCI switching between PDSCH transmissions may be insufficient. The UE may detect the potential conflict based at least in part on a UE capability of receiving one or more PDSCH transmissions in a single slot. In this case, the PDSCH transmission and the second transmission may not overlap in time and the amount of time for TCI switching may be sufficient, but the UE may not be capable of receiving two PDSCH transmissions in a single slot. As a result, depending on whether the certain conditions are met (e.g., overlap in time based at least in part on SLIVs, time gap for TCI switching satisfying the threshold, and/or the UE capability of receiving one or more PDSCH transmissions in the single slot), the UE may detect the PDSCH transmission that potentially conflicts with the second transmission.

As shown by reference number 504, the UE may determine to keep at least one of the PDSCH transmission associated with the multi-PDSCH SPS or the second transmission in the slot based at least in part on one or more rules. The one or more rules may define in which cases the UE should keep the PDSCH transmission associated with the multi-PDSCH SPS, in which cases the UE should keep the second transmission, and in which cases the UE should keep both the PDSCH transmission associated with the multi-PDSCH SPS and the second transmission.

In some aspects, the PDSCH transmission may be a first PDSCH transmission, the multi-PDSCH SPS may be a first multi-PDSCH SPS, the second transmission may be a second PDSCH transmission associated with a second multi-PDSCH SPS, the first PDSCH transmission may be one of multiple PDSCH transmissions of a first burst within a first configured period associated with the first multi-PDSCH SPS, and the second PDSCH transmission may be one of multiple PDSCH transmissions of a second burst within a second configured period associated with the second multi-PDSCH SPS.

In some aspects, the UE may determine, based at least in part on the one or more rules, to keep at least one of the first PDSCH transmission or the second PDSCH transmission based at least in part on a lowest SPS configuration index between the first multi-PDSCH SPS and the second multi-PDSCH SPS. In some aspects, the UE may determine, based at least in part on the one or more rules, to keep at least one of the first PDSCH transmission or the second PDSCH transmission based at least in part on a first SLIV associated with the first PDSCH transmission, a second SLIV associated with the second PDSCH transmission, and a TCI switching delay associated with the first multi-PDSCH SPS or the second multi-PDSCH SPS.

In some aspects, the UE may determine, based at least in part on the one or more rules, to keep at least one of the first PDSCH transmission or the second PDSCH transmission based at least in part on a largest quantity of scheduled PDSCHs between the first burst of the first multi-PDSCH SPS and the second burst of the second multi-PDSCH SPS. In some aspects, the UE may determine, based at least in part on the one or more rules, to keep at least one of the first PDSCH transmission or the second PDSCH transmission based at least in part on an earliest start between an earliest PDSCH transmission within the first burst of the first multi-PDSCH SPS and an earliest PDSCH transmission within the second burst of the second multi-PDSCH SPS.

For example, the first burst of the first multi-PDSCH SPS may occupy slot 0, slot 1, and slot 2, and the second burst of the second multi-PDSCH SPS may occupy slot 1, slot 2, and slot 3. In this case, the first burst of the first multi-PDSCH SPS may start earlier than the second burst of the second multi-PDSCH SPS, and the second burst of the second multi-PDSCH SPS may end later than the first burst of the first multi-PDSCH SPS.

In some aspects, the UE may determine, based at least in part on the one or more rules, to keep at least one of the first PDSCH transmission or the second PDSCH transmission based at least in part on an earliest end between the first burst of the first multi-PDSCH SPS and the second burst of the second multi-PDSCH SPS. In some aspects, the UE may keep both the first PDSCH transmission and the second PDSCH transmission based at least in part on a first SLIV associated with the first PDSCH transmission not overlapping with a second SLIV associated with the second PDSCH transmission, and based at least in part on a UE capability of receiving one or more PDSCH transmissions in a single slot.

In some aspects, the UE may determine, based at least in part on the one or more rules, to keep at least one of the first PDSCH transmission or the second PDSCH transmission based at least in part on a random selection between the first multi-PDSCH SPS and the second multi-PDSCH SPS. In some aspects, the UE may determine, based at least in part on the one or more rules, to keep at least one of the first PDSCH transmission or the second PDSCH transmission based at least in part on a detection of a previous PDSCH transmission within the first burst associated with the first multi-PDSCH SPS or within the second burst associated with the second multi-PDSCH SPS.

In some aspects, the UE may keep the first PDSCH transmission associated with the first multi-PDSCH SPS and drop the second PDSCH transmission associated with the second multi-PDSCH SPS. The UE may continue to receive PDSCH transmissions subsequent to the second PDSCH transmission of the second burst associated with the second multi-PDSCH SPS. The UE may drop (or ignore) PDSCH transmissions subsequent to the second PDSCH transmission of the second burst associated with the second multi-PDSCH SPS. In other words, the UE may keep receiving PDSCH transmissions subsequent to the second PDSCH transmission associated with the second multi-PDSCH SPS, or alternatively, the UE may drop (or ignore) PDSCH transmissions subsequent to the second PDSCH transmission associated with the second multi-PDSCH SPS.

In some aspects, the second transmission in the slot may be a dynamically scheduled PDSCH transmission. The dynamically scheduled PDSCH transmission may be associated with a higher priority than the PDSCH transmission associated with the multi-PDSCH SPS. In some aspects, the UE may keep the dynamically scheduled PDSCH transmission and drop the PDSCH transmission, and the UE may keep PDSCH transmissions subsequent to the PDSCH transmission associated with the multi-PDSCH SPS. In some aspects, the UE may keep the dynamically scheduled PDSCH transmission, and the UE may drop the PDSCH transmission and drop PDSCH transmissions subsequent to the PDSCH transmission that are associated with the multi-PDSCH SPS.

In some aspects, the UE may keep both the PDSCH transmission and the dynamically scheduled PDSCH transmission based at least in part on a first SLIV associated with the PDSCH transmission not overlapping with a second SLIV associated with the dynamically scheduled PDSCH transmission, and based at least in part on a UE capability of receiving one or more PDSCH transmissions in a single slot.

In some aspects, the second transmission in the slot may correspond to static uplink symbols for a potential uplink transmission. The UE, when determining to keep one of the PDSCH transmission or the static uplink symbols for the potential uplink transmission, may drop the PDSCH transmission. In some cases, the static uplink symbols may be reserved for an uplink transmission, but an actual uplink transmission may not occur during the static uplink symbols. In other words, in some cases, no uplink transmission may actually occur within the static uplink symbols, but when the static uplink symbols conflict with the PDSCH transmission, the UE may still drop the PDSCH transmission.

As shown by reference number 506, the UE may perform, with the base station in the slot, at least one of the PDSCH transmission associated with the multi-PDSCH SPS or the second transmission that is kept based at least in part on the one or more rules. In other words, the UE may perform the PDSCH transmission and/or the second transmission in the slot, depending on which of the PDSCH transmission and/or the second transmission is kept based at least in part on the one or more rules.

In some aspects, the base station may detect a PDSCH transmission associated with a multi-PDSCH SPS that potentially conflicts with a second transmission in a slot. The base station may determine to keep the PDSCH transmission associated with the multi-PDSCH SPS and/or the second transmission in the slot based at least in part on the one or more rules. The base station may perform, with a base station in the slot, the PDSCH transmission associated with the multi-PDSCH SPS and/or the second transmission that is kept based at least in part on the one or more rules. From the perspective of the base station, when a potentially conflicting PDSCH transmission is skipped, the base station may not perform that PDSCH transmission.

As indicated above, FIG. 5 is provided as an example. Other examples may differ from what is described with regard to FIG. 5.

In some aspects, for potentially conflicting PDSCH transmissions from different SPSs, multi-PDSCH SPSs may be allowed to at least partially overlap in time. Alternatively, multi-PDSCH SPSs may not overlap in time.

In some aspects, for a PDSCH transmission from a multi-PDSCH SPS conflicting with a PDSCH transmission from another SPS, where each SPS may be a multi-PDSCH SPS, a decision regarding which PDSCH transmission to keep may be a per-PDSCH-based decision. For example, a PDSCH transmission from a lowest sps-ConfigIndex may be kept. The decision regarding which PDSCH transmission to keep may be based at least in part on a SLIV, and may not consider a TCI switching gap for a following PDSCH/slot, which may degrade a system performance. The TCI switching gap may be associated with a highest sps-ConfigIndex.

In some aspects, the decision regarding which PDSCH transmission to keep may be based at least in part on the SLIV and the TCI switching gap. The TCI switching gap may allow a UE to switch from a first beam associated with a first SPS and a second beam associated with a second SPS. The TCI switching gap may span several symbols, during which the UE may perform beam switching. Two PDSCH transmissions may not overlap with respect to the SLIV (e.g., a first PDSCH transmission may be associated with symbols 0 through 6, and a second PDSCH transmission may be associated with symbols 7 through 13, such that corresponding SLIVs do not overlap), but the TCI switching gap may at least partially overlap with at least one of the SLIVs. In this case, the decision regarding which PDSCH transmission to keep (or PDSCH transmission pruning) may consider both SLIV overlapping and TCI switching gaps or delays. The TCI switching gap (e.g., a gap duration) may be configured via radio resource control (RRC) signaling.

Figure 6:
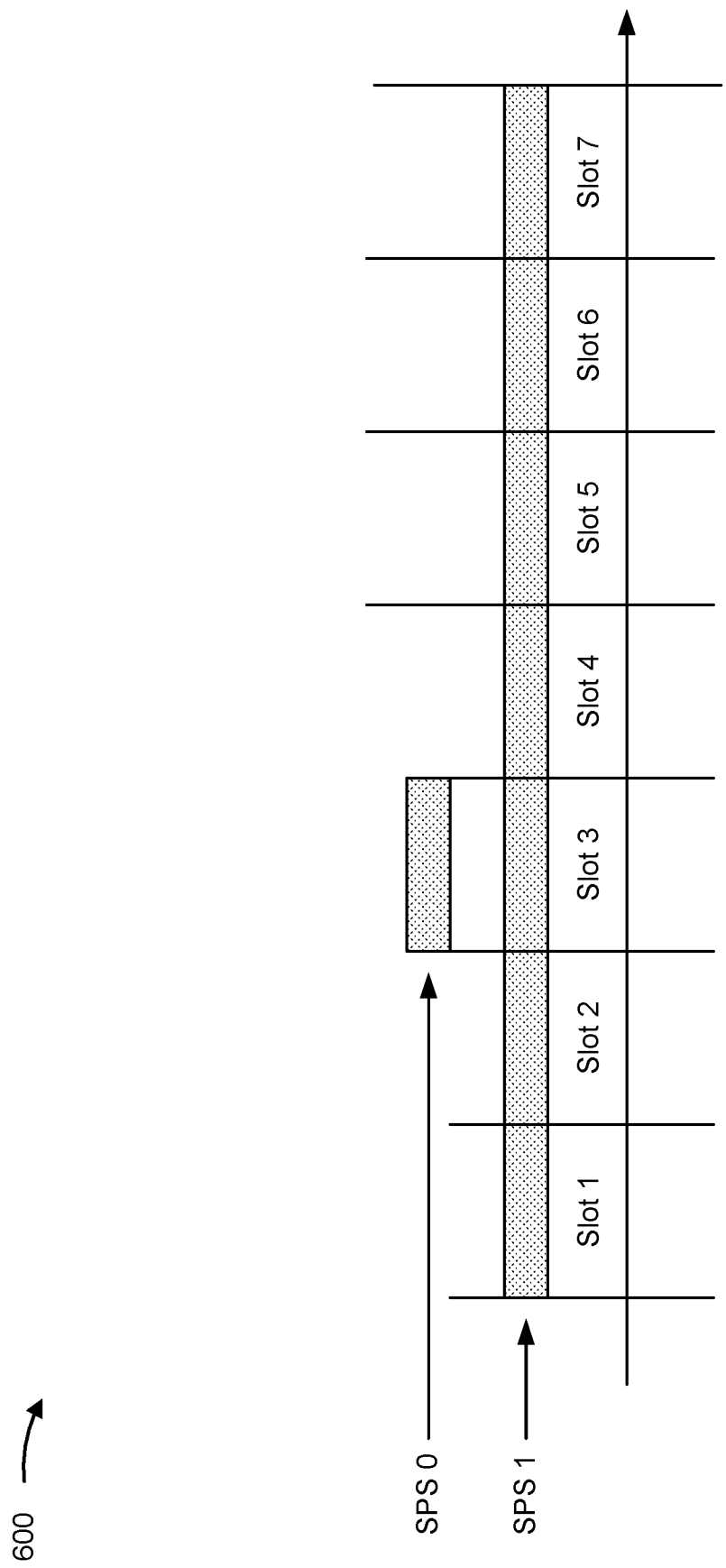
FIG. 6 is a diagram illustrating an example associated with considering a start and length indicator value (SLIV) and a transmission configuration indicator (TCI) switching gap for overlapping PDSCH transmissions from different SPSs, in accordance with the present disclosure.

FIG. 6 is a diagram illustrating an example 600 of considering a SLIV and a TCI switching gap for overlapping PDSCH transmissions from different SPSs, in accordance with the present disclosure.

In some aspects, both the SLIV and the TCI switching gap may be considered for conflicting PDSCH transmissions from different SPSs. In other words, both the SLIV and the TCI switching gap may be considered when determining which PDSCH transmission to keep and which PDSCH transmission to drop. In some aspects, a consideration of the TCI switching gap may apply to an overlapping of single PDSCH/PUSCH SPSs/CGs when repetitions are present.

As shown in FIG. 6, a first SPS (SPS 0) may be associated with a PDSCH transmission in slot 3, and a second SPS (SPS 1) may be associated with a separate PDSCH transmission in each of slot 1, slot 2, slot 3, slot 4, slot 5, and slot 6. In this case, when keeping an SPS with a lowest sps-ConfigIndex, the PDSCH transmission from the first SPS in slot 3 may be kept. Further, the PDSCH transmission from the second SPS in slot 3 may be dropped. However, keeping the PDSCH transmission from the first SPS in slot 3 may have several drawbacks. For example, both PDSCH transmissions in slot 2 and slot 4 for the second SPS may need to take a hit due to TCI switching, which may lead to a performance degradation. In other words, a TCI switching gap may be needed for beam switching between the PDSCH transmission from the second SPS in slot 2 and the PDSCH transmission from the first SPS in slot 3, and similarly, a TCI switching gap may be needed for beam switching between the PDSCH transmission from the first SPS in slot 3 and the PDSCH transmission from the second SPS in slot 4. Although SLIVs may not overlap between the PDSCH in slot 3 of the first SPS and the PDSCHs in slot 2 and 4 of the second SPS, respectively, the TCI switching gaps may overlap with the SLIVs. Further, keeping the PDSCH transmission from the first SPS in slot 3 may result in re-tuning to a new band of the first SPS and/or a fragmented hybrid automatic repeat request (HARQ) identifier usage for the second SPS. As a result, in this case, selecting the PDSCH transmission from the second SPS in slot 3 may be favorable instead of selecting the PDSCH transmission from the first SPS in slot 3, considering a potential overhead with respect to TCI switching and other overhead. The PDSCH transmission from the second SPS in slot 3 may be kept based at least in part on a consideration of SLIVs and TCI switching gaps with respect to the first SPS and the second SPS, which may correspond to different multi-PDSCH SPSs.

As indicated above, FIG. 6 is provided as an example. Other examples may differ from what is described with regard to FIG. 6.

In some aspects, for a PDSCH transmission from an SPS overlapping with a PDSCH transmission from another SPS, where each SPS may be a multi-PDSCH SPS, additional rules may be considered when determining which PDSCH transmission to keep. The additional rules may be in addition to considering the SLIV and the TCI switching gap when determining which PDSCH transmission to keep.

In some aspects, PDSCH transmissions from an SPS with the largest quantity of scheduled PDSCH transmissions, as compared to another SPS, may be kept. Since PDSCH transmissions within a same burst may have a contiguous HARQ identifier, keeping the PDSCH transmissions from the SPS with the largest quantity of scheduled PDSCH transmissions may prevent HARQ identifier fragmentation, and may result in a higher quantity of received PDSCH transmissions. In some aspects, for an equal quantity of PDSCH transmissions between different SPSs, an SPS with a lowest sps-ConfigIndex may be selected between the different SPSs.

In some aspects, PDSCH transmissions of a first burst from an SPS that start earliest in time, as compared to PDSCH transmissions of a second bust from another SPS, may be kept. When a UE has started receiving the PDSCH transmissions from the first burst of the SPS that starts earliest in time, continuing to receive the PDSCH transmissions from the SPS may avoid RF switching/retuning, and/or may avoid a new channel estimation for a different band, which may be applicable when DMRS bundling is enabled across a burst. In some aspects, when two SPSs start at a same slot, an SPS with a lowest sps-ConfigIndex may be selected between the two SPSs.

In some aspects, a first burst of PDSCH transmissions from an SPS that ends earliest in time, as compared to a second burst of PDSCH transmissions from another SPS, may be kept. In this case, the UE may complete a decoding of a PDSCH and may feedback an acknowledgement or negative acknowledgement (A/N) in an earliest physical uplink control channel (PUCCH) occasion as compared to the PDSCH transmissions from the other SPS that ends later in time.

In some aspects, both PDSCH transmissions associated with two different SPSs may be kept when a SLIV does not overlap between the two different SPSs and the UE is capable of receiving multiple PDSCH transmissions in one slot. In some cases, both PDSCH transmissions may be kept when the SLIV does overlap between the two different SPSs and the UE is capable of receiving multiple PDSCH transmissions in one slot. For example, a multi-TRP (M-TRP)-based SPS may involve receiving a multi-PDSCH transmission with an overlapping SLIV. The UE may use a single default beam to receive the multiple PDSCH transmissions in a same slot when the UE is not capable of using two different beams in the same slot. The UE may receive the multiple PDSCH transmissions in the same slot when the multiple PDSCH transmissions are frequency division multiplexed with overlapping SLIVs.

In some aspects, selecting between two SPSs may be based at least in part on fairness and equal opportunity rules, which may lead to a fragmented HARQ identifier to be retransmitted. For example, the fairness and equal opportunity rules may enable a random selection between the two SPSs.

In some aspects, selecting between SPSs may be based at least in part on a detection-based consideration. In some cases, a particular SPS may be skipped or not transmitted at all. Therefore, a decision on selecting between SPSs may be based at least in part on whether a previous PDSCH transmission of an SPS has been detected.

In some aspects, the additional rules that are considered when determining which PDSCH transmission to keep may not be exclusive with each other, and in some cases, the additional rules may be combined and/or may be considered in some order. For example, when PDSCH transmissions from two SPSs conflict, a rule associated with keeping the PDSCH transmissions from the SPS with the largest quantity of scheduled PDSCH transmissions may first be considered. When both SPSs have an equal quantity of PDSCH transmissions, then a rule associated with keeping the PDSCH transmissions from the SPS that starts earliest in time may be considered. When both SPSs have the equal quantity of PDSCH transmissions and also start at the same slot, then a rule associated with keeping both PDSCH transmissions when the SLIV does not overlap may be considered. In this case, a rule associated with keeping the PDSCH transmissions from the SPS which ends earliest in time may not be applicable since both SPSs may end at the same slot.

In some aspects, the additional rules may be combined in order to resolve conflicting PDSCH transmissions. For example, the rule associated with keeping the PDSCH transmissions from the SPS with the largest quantity of scheduled PDSCH transmissions, by itself and without combination with any other rules, may be unable to resolve a case in which two SPSs have a same quantity of PDSCH transmissions scheduled in a burst. The additional rules may be used to resolve conflicting PDSCH transmissions from multi-PDSCH SPSs.

In some aspects, when the additional rules are all considered and conflicting PDSCH transmissions are still not resolved, then the PDSCH transmission from the SPS with the lowest sps-ConfigIndex may be kept.

In some aspects, when one PDSCH transmission associated with a multi-PDSCH SPS is dropped, PDSCH transmissions subsequent to the dropped PDSCH transmission associated with the multi-PDSCH SPS may or may not also be dropped. A decision on whether to keep the PDSCH transmissions subsequent to the dropped PDSCH transmission may be on a per-PDSCH transmission basis and not on a per-SPS basis. In some aspects, with respect to the PDSCH transmissions subsequent to the one PDSCH transmission, PDSCH transmission(s) that overlap with higher-priority PDSCH transmission(s) may be canceled. In some aspects, a plurality of PDSCH transmissions (e.g., all PDSCH transmissions) scheduled within a multi-PDSCH transmission burst may be canceled. The plurality of PDSCH transmissions may be canceled based at least in part on a consideration of a potential TCI switching gap, in which case an entire burst may be canceled.

Figure 7:
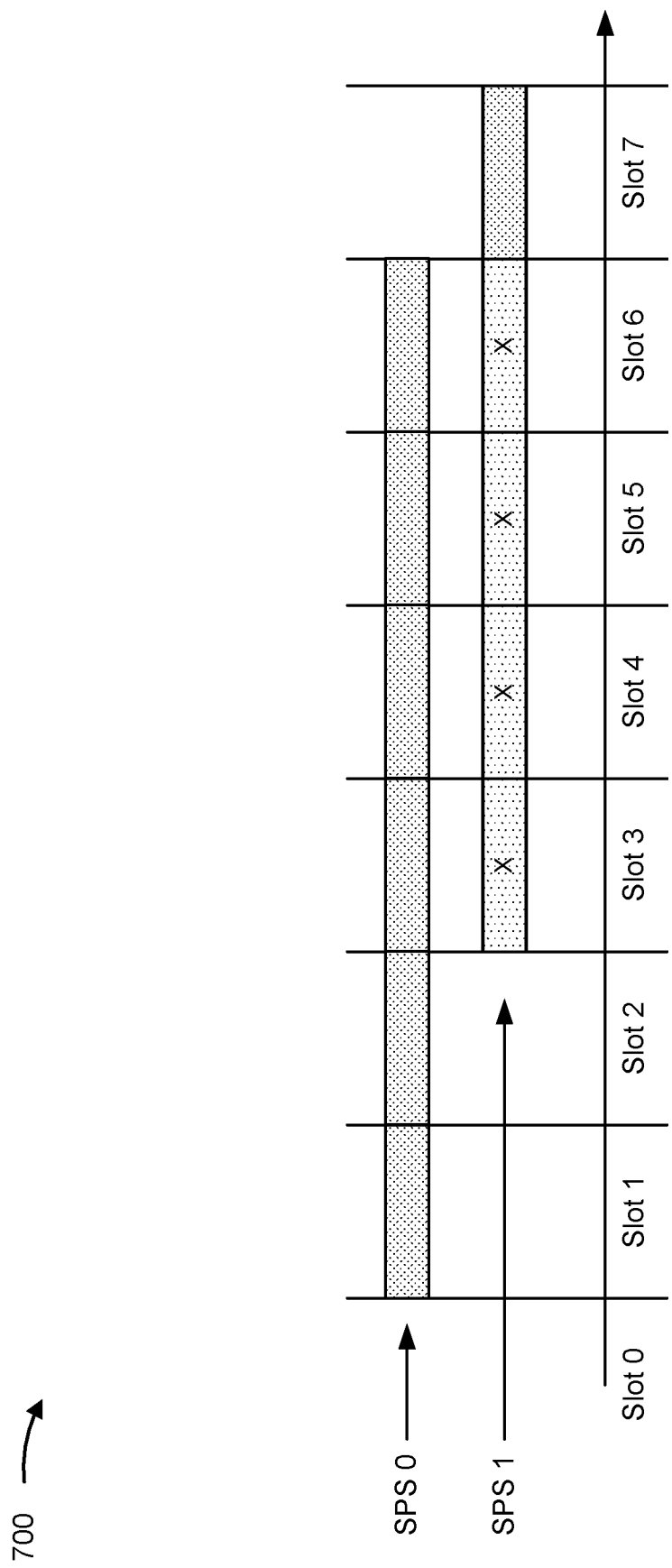
FIG. 7 is a diagram illustrating an example associated with PDSCH transmissions subsequent to conflicting PDSCH transmissions that are associated with a multi-PDSCH SPS, in accordance with the present disclosure.

FIG. 7 is a diagram illustrating an example 700 of PDSCH transmissions subsequent to conflicting PDSCH transmissions that are associated with a multi-PDSCH SPS, in accordance with the present disclosure.

As shown in FIG. 7, a first SPS (SPS 0) may be associated with a separate PDSCH transmission in each of slot 1, slot 2, slot 3, slot 4, slot 5, and slot 6. A second SPS (SPS 1) may be associated with a separate PDSCH transmission in each of slot 3, slot 4, slot 5, slot 6, and slot 7. In this example, the first SPS may be a higher priority than the second SPS. For example, the first SPS may be associated with a lowest sps-ConfigIndex between the first SPS and the second SPS. In one example, since the first SPS may be associated with the higher priority, PDSCH transmissions associated with the second SPS in slot 3, slot 4, slot 5, and slot 6 may be dropped, and corresponding PDSCH transmissions associated with the first SPS may be kept. In this case, the PDSCH transmission associated with the second SPS in slot 7 may be kept. In another example, since a TCI switching gap may be needed for beam switching between the PDSCH transmission associated with the first SPS in slot 6 and the PDSCH transmission associated with the second SPS in slot 7, the PDSCH transmission associated with the second SPS in slot 7 may be dropped as well. In this case, a plurality of PDSCH transmissions associated with the second SPS may not be kept.

As indicated above, FIG. 7 is provided as an example. Other examples may differ from what is described with regard to FIG. 7.

Figure 8:
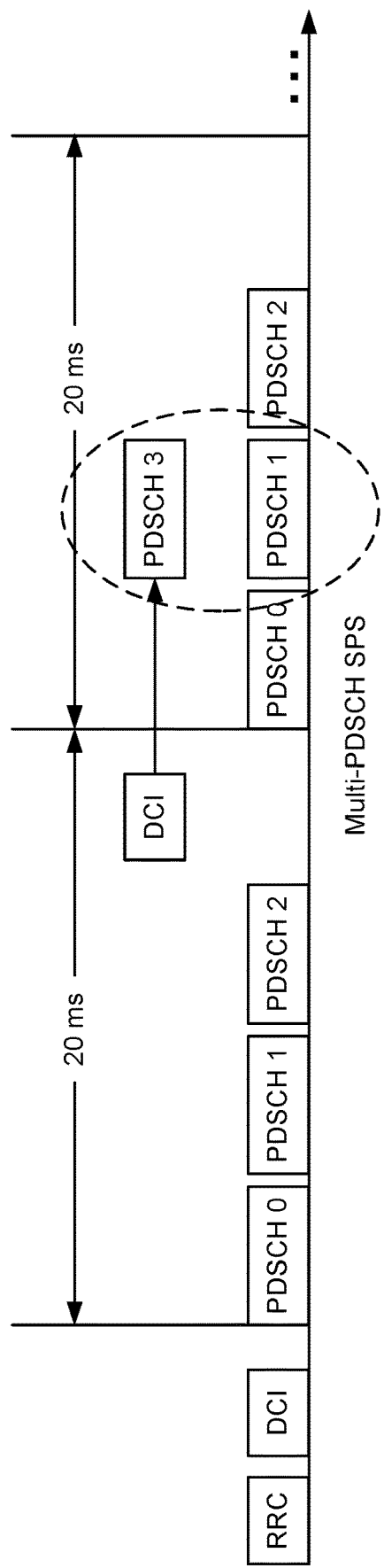
FIG. 8 is a diagram illustrating an example associated with a dynamically scheduled PDSCH transmission that overlaps with a PDSCH transmission associated with a multi-PDSCH SPS, in accordance with the present disclosure.

FIG. 8 is a diagram illustrating an example 800 of a dynamically scheduled PDSCH transmission that overlaps with a PDSCH transmission associated with a multi-PDSCH SPS, in accordance with the present disclosure.

As shown in FIG. 8, a multi-PDSCH SPS may be associated with a multi-PDSCH transmission scheduled in accordance with a periodicity (e.g., 20 ms). The multi-PDSCH transmission may include a first PDSCH transmission (PDSCH 0), a second PDSCH transmission (PDSCH 1), and a third PDSCH transmission (PDSCH 2) in a configured period (e.g., 20 ms). In some cases, a DCI may schedule a dynamically scheduled PDSCH transmission (PDSCH 3), where the dynamically scheduled PDSCH transmission may overlap with a PDSCH transmission (e.g., the second PDSCH transmission) associated with the multi-PDSCH SPS.

In some aspects, for a dynamically scheduled PDSCH transmission (or PDSCH retransmission) that overlaps with a multi-PDSCH SPS, the dynamically scheduled PDSCH transmission may have a higher priority as compared to PDSCH transmissions associated with the multi-PDSCH SPS, and only a PDSCH transmission from the multi-PDSCH SPS that overlaps with the dynamically scheduled PDSCH transmission may be canceled. Remaining PDSCH transmissions associated with the multi-PDSCH SPS may be kept since these PDSCH transmissions do not overlap with the dynamically scheduled PDSCH transmission.

In some aspects, the second PDSCH transmission associated with the multi-PDSCH SPS may be dropped, and the dynamically scheduled PDSCH transmission may be kept. However, in some cases, keeping the dynamically scheduled PDSCH transmission may result in a performance degradation, as a TCI switching gap may need to be absorbed into the multi-PDSCH SPS. For example, TCI switching gaps may be inserted in the first PDSCH transmission associated with the multi-PDSCH SPS and the third PDSCH transmission associated with the multi-PDSCH SPS, respectively.

As an example, when the dynamically scheduled PDSCH transmission has the higher priority and only the PDSCH transmission from the multi-PDSCH SPS that overlaps with the dynamically scheduled PDSCH transmission is canceled, the first PDSCH transmission and the third PDSCH transmission associated with the multi-PDSCH SPS may be kept and the dynamically scheduled PDSCH transmission may be kept. The first PDSCH transmission and the third PDSCH transmission may include TCI switching gaps.

In some aspects, the dynamically scheduled PDSCH transmission may have a higher priority, and the multi-PDSCH SPS may be dropped for a remaining burst. A TCI switching gap may need additional time to overlap with a following PDSCH transmission, so the remaining burst may be canceled. As an example, the remaining burst may be the second PDSCH transmission and the third PDSCH transmission associated with the multi-PDSCH SPS.

As an example, when the dynamically scheduled PDSCH transmission has the higher priority and the multi-PDSCH SPS is dropped for the remaining burst, the first PDSCH transmission may be kept and the dynamically scheduled PDSCH transmission may be kept. The first PDSCH transmission may include a TCI switching gap.

In some aspects, both the dynamically scheduled PDSCH transmission and the PDSCH transmission from the multi-PDSCH SPS that occur in the same slot with the dynamically scheduled PDSCH transmission may be kept, as long as no corresponding SLIV is overlapping and a UE is capable of processing multiple PDSCH transmissions per slot.

As an example, when both the dynamically scheduled PDSCH transmission and PDSCH transmission(s) without SLIV overlapping are kept, the first PDSCH transmission, the second PDSCH transmission, and the third PDSCH transmission associated with the multi-PDSCH SPS may be kept and the dynamically scheduled PDSCH transmission may be kept. The first PDSCH transmission, the second PDSCH transmission, and the third PDSCH transmission may include TCI switching gaps.

As indicated above, FIG. 8 is provided as an example. Other examples may differ from what is described with regard to FIG. 8.

In some aspects, an SPS PDSCH transmission may overlap with static uplink symbols. The SPS PDSCH transmission may be associated with a multi-PDSCH SPS. When a PDSCH transmission among multiple PDSCH transmissions that are scheduled by an SPS collide with uplink symbol(s), the UE may not receive the PDSCH transmission. In this case, a HARQ identifier may not be skipped. In other words, even though a slot gap may be present due to a skipped PDSCH transmission, the HARQ identifier may be continuous.

Figure 9:
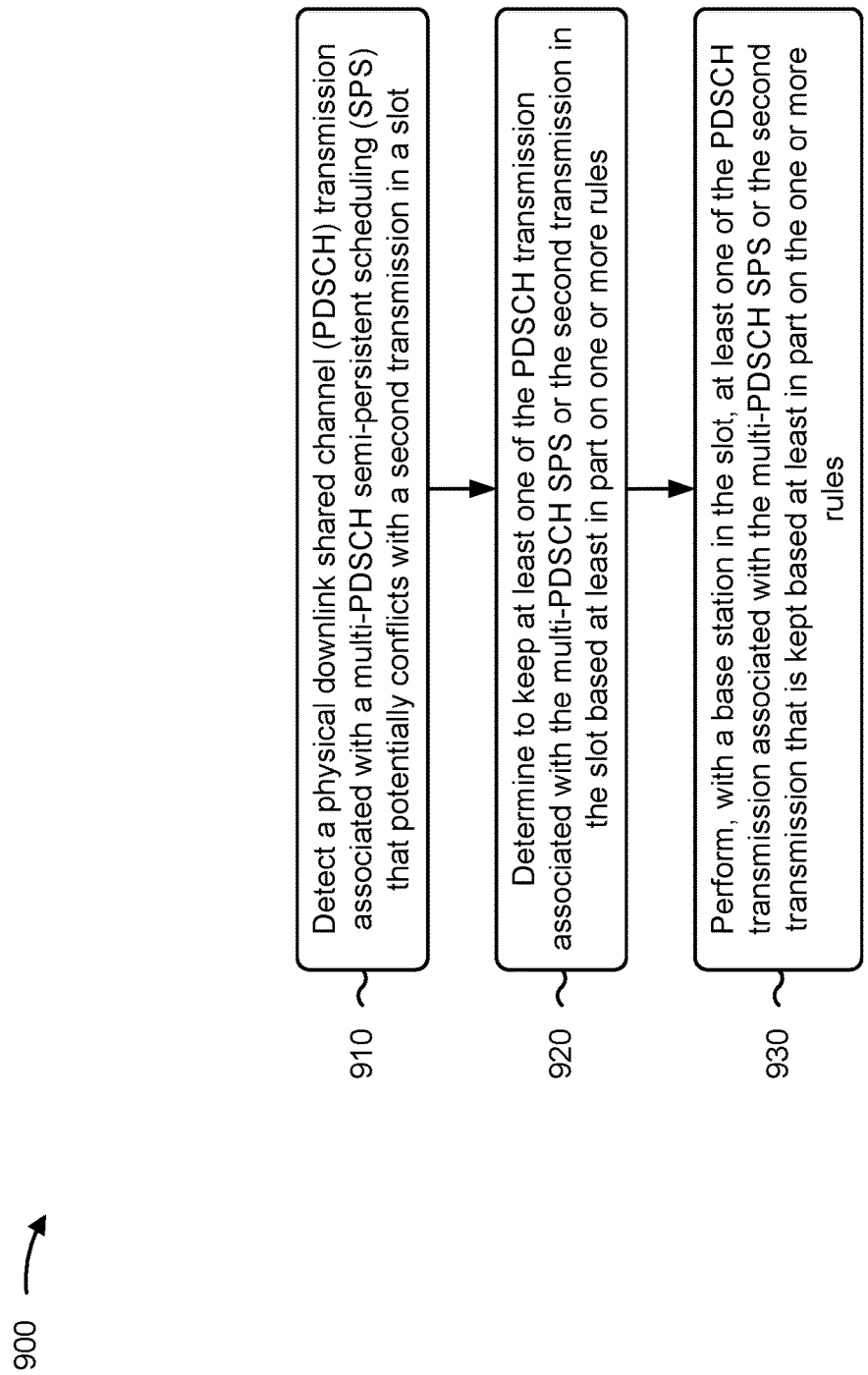
FIG. 9 is a diagram illustrating an example process associated with a potentially conflicting PDSCH transmission associated with a multi-PDSCH SPS, in accordance with the present disclosure.

FIG. 9 is a diagram illustrating an example process 900 performed, for example, by a UE, in accordance with the present disclosure. Example process 900 is an example where the UE (e.g., UE 120) performs operations associated with a potentially conflicting PDSCH transmission associated with a multi-PDSCH SPS.

As shown in FIG. 9, in some aspects, process 900 may include detecting a PDSCH transmission associated with a multi-PDSCH SPS that potentially conflicts with a second transmission in a slot (block 910). For example, the UE (e.g., using communication manager 140 and/or detection component 1008, depicted in FIG. 10) may detect a PDSCH transmission associated with a multi-PDSCH SPS that potentially conflicts with a second transmission in a slot, as described above.

As further shown in FIG. 9, in some aspects, process 900 may include determining to keep at least one of the PDSCH transmission associated with the multi-PDSCH SPS or the second transmission in the slot based at least in part on one or more rules (block 920). For example, the UE (e.g., using communication manager 140 and/or determination component 1010, depicted in FIG. 10) may determine to keep at least one of the PDSCH transmission associated with the multi-PDSCH SPS or the second transmission in the slot based at least in part on one or more rules, as described above.

As further shown in FIG. 9, in some aspects, process 900 may include performing, with a base station in the slot, at least one of the PDSCH transmission associated with the multi-PDSCH SPS or the second transmission that is kept based at least in part on the one or more rules (block 930). For example, the UE (e.g., using communication manager 140 and/or reception component 1002 or transmission component 1004, depicted in FIG. 10) may perform, with a base station in the slot, at least one of the PDSCH transmission associated with the multi-PDSCH SPS or the second transmission that is kept based at least in part on the one or more rules, as described above.

Process 900 may include additional aspects, such as any single aspect or any combination of aspects described below and/or in connection with one or more other processes described elsewhere herein.

In a first aspect, detecting the PDSCH transmission that potentially conflicts with the second transmission is based at least in part on one or more of an overlapping in time between the PDSCH transmission and the second transmission, a time gap for TCI switching between the PDSCH transmission and the second transmission that does not satisfy a threshold, or a UE capability of receiving one or more PDSCH transmissions in a single slot.

In a second aspect, alone or in combination with the first aspect, the PDSCH transmission is a first PDSCH transmission, the multi-PDSCH SPS is a first multi-PDSCH SPS, the second transmission is a second PDSCH transmission associated with a second multi-PDSCH SPS, the first PDSCH transmission is one of multiple PDSCH transmissions of a first burst within a first configured period associated with the first multi-PDSCH SPS, and the second PDSCH transmission is one of multiple PDSCH transmissions of a second burst within a second configured period associated with the second multi-PDSCH SPS.

In a third aspect, alone or in combination with one or more of the first and second aspects, determining to keep at least one of the first PDSCH transmission or the second PDSCH transmission is based at least in part on a lowest SPS configuration index between the first multi-PDSCH SPS and the second multi-PDSCH SPS.

In a fourth aspect, alone or in combination with one or more of the first through third aspects, determining to keep at least one of the first PDSCH transmission or the second PDSCH transmission is based at least in part on a first SLIV associated with the first PDSCH transmission, a second SLIV associated with the second PDSCH transmission, and a TCI switching delay associated with the first multi-PDSCH SPS or the second multi-PDSCH SPS.

In a fifth aspect, alone or in combination with one or more of the first through fourth aspects, determining to keep at least one of the first PDSCH transmission or the second PDSCH transmission is based at least in part on a largest quantity of scheduled PDSCHs between the first burst of the first multi-PDSCH SPS and the second burst of the second multi-PDSCH SPS.

In a sixth aspect, alone or in combination with one or more of the first through fifth aspects, determining to keep at least one of the first PDSCH transmission or the second PDSCH transmission is based at least in part on an earliest start between an earliest PDSCH transmission within the first burst of the first multi-PDSCH SPS and an earliest PDSCH transmission within the second burst of the second multi-PDSCH SPS.

In a seventh aspect, alone or in combination with one or more of the first through sixth aspects, determining to keep at least one of the first PDSCH transmission or the second PDSCH transmission is based at least in part on an earliest end between the first burst of the first multi-PDSCH SPS and the second burst of the second multi-PDSCH SPS.

In an eighth aspect, alone or in combination with one or more of the first through seventh aspects, process 900 includes keeping both the first PDSCH transmission and the second PDSCH transmission based at least in part on a first SLIV associated with the first PDSCH transmission not overlapping with a second SLIV associated with the second PDSCH transmission, and based at least in part on a UE capability of receiving one or more PDSCH transmissions in a single slot.

In a ninth aspect, alone or in combination with one or more of the first through eighth aspects, determining to keep at least one of the first PDSCH transmission or the second PDSCH transmission is based at least in part on a random selection between the first multi-PDSCH SPS and the second multi-PDSCH SPS.

In a tenth aspect, alone or in combination with one or more of the first through ninth aspects, determining to keep at least one of the first PDSCH transmission or the second PDSCH transmission is based at least in part on a detection of a previous PDSCH transmission within the first burst associated with the first multi-PDSCH SPS or within the second burst associated with the second multi-PDSCH SPS.

In an eleventh aspect, alone or in combination with one or more of the first through tenth aspects, process 900 includes keeping the first PDSCH transmission associated with the first multi-PDSCH SPS and dropping the second PDSCH transmission associated with the second multi-PDSCH SPS based at least in part on the first PDSCH transmission having a higher priority than the second PDSCH transmission.

In a twelfth aspect, alone or in combination with one or more of the first through eleventh aspects, process 900 includes keeping PDSCH transmissions subsequent to the second PDSCH transmission of the second burst associated with the second multi-PDSCH SPS.

In a thirteenth aspect, alone or in combination with one or more of the first through twelfth aspects, process 900 includes canceling PDSCH transmissions subsequent to the second PDSCH transmission of the second burst associated with the second multi-PDSCH SPS.

In a fourteenth aspect, alone or in combination with one or more of the first through thirteenth aspects, the second transmission in the slot is a dynamically scheduled PDSCH transmission.

In a fifteenth aspect, alone or in combination with one or more of the first through fourteenth aspects, process 900 includes keeping the dynamically scheduled PDSCH transmission and dropping the PDSCH transmission, and keeping PDSCH transmissions subsequent to the PDSCH transmission associated with the multi-PDSCH SPS.

In a sixteenth aspect, alone or in combination with one or more of the first through fifteenth aspects, process 900 includes keeping the dynamically scheduled PDSCH transmission, and dropping the PDSCH transmission and dropping PDSCH transmissions subsequent to the PDSCH transmission that are associated with the multi-PDSCH SPS.

In a seventeenth aspect, alone or in combination with one or more of the first through sixteenth aspects, process 900 includes keeping both the PDSCH transmission and the dynamically scheduled PDSCH transmission based at least in part on a first SLIV associated with the PDSCH transmission not overlapping with a second SLIV associated with the dynamically scheduled PDSCH transmission, and based at least in part on a UE capability of receiving one or more PDSCH transmissions in a single slot.

In an eighteenth aspect, alone or in combination with one or more of the first through seventeenth aspects, the second transmission in the slot corresponds to static uplink symbols for a potential uplink transmission, and process 900 includes dropping the PDSCH transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
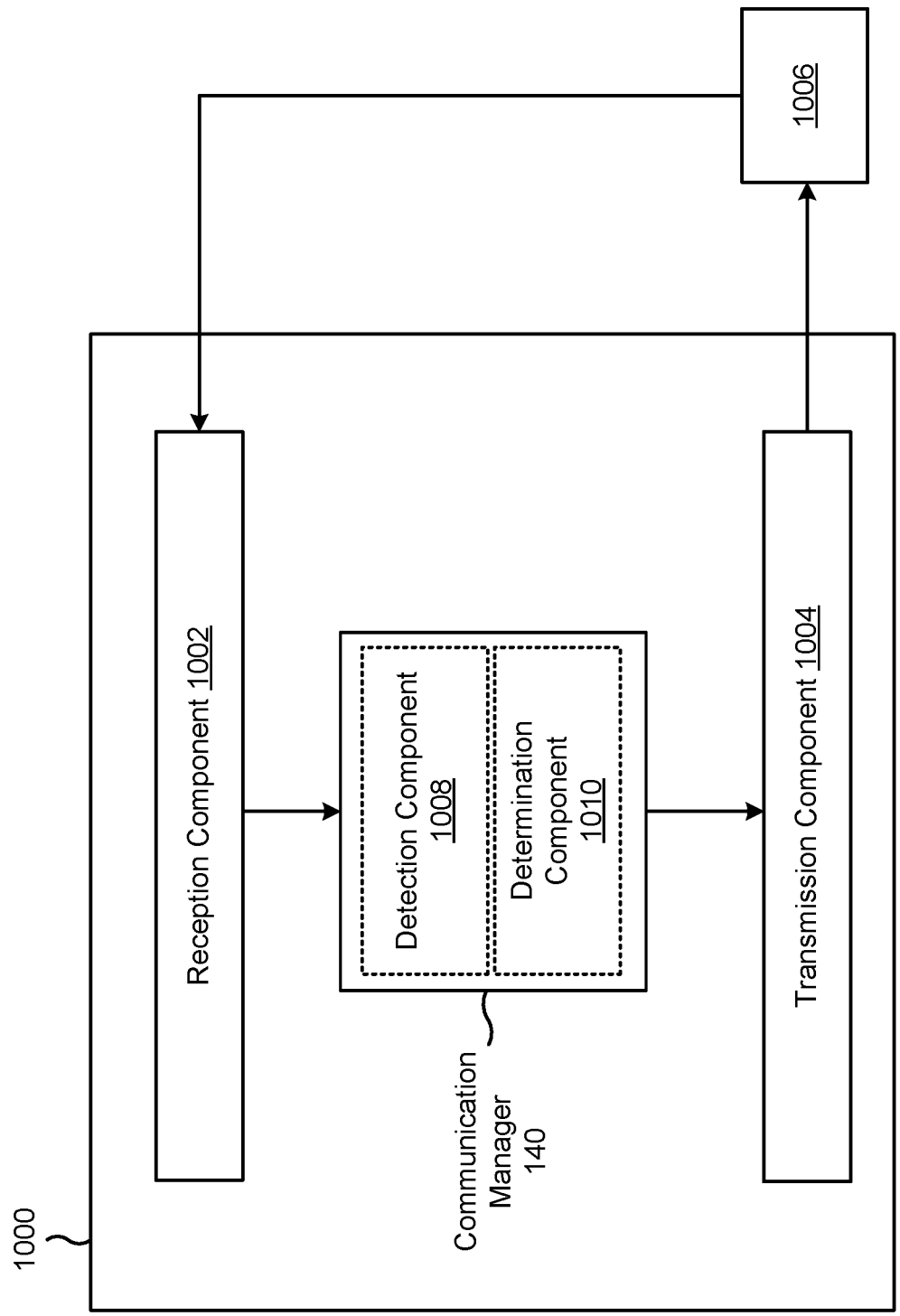
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of a detection component 1008, or a determination component 1010, among other examples.

In some aspects, the apparatus 1000 may be configured to perform one or more operations described herein in connection with FIGS. 5-8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The detection component 1008 may detect a PDSCH transmission associated with a multi-PDSCH SPS that potentially conflicts with a second transmission in a slot. The determination component 1010 may determine to keep at least one of the PDSCH transmission associated with the multi-PDSCH SPS or the second transmission in the slot based at least in part on one or more rules. The reception component 1002 or the transmission component 1004 may perform, with a base station in the slot, at least one of the PDSCH transmission associated with the multi-PDSCH SPS or the second transmission that is kept based at least in part on the one or more rules.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
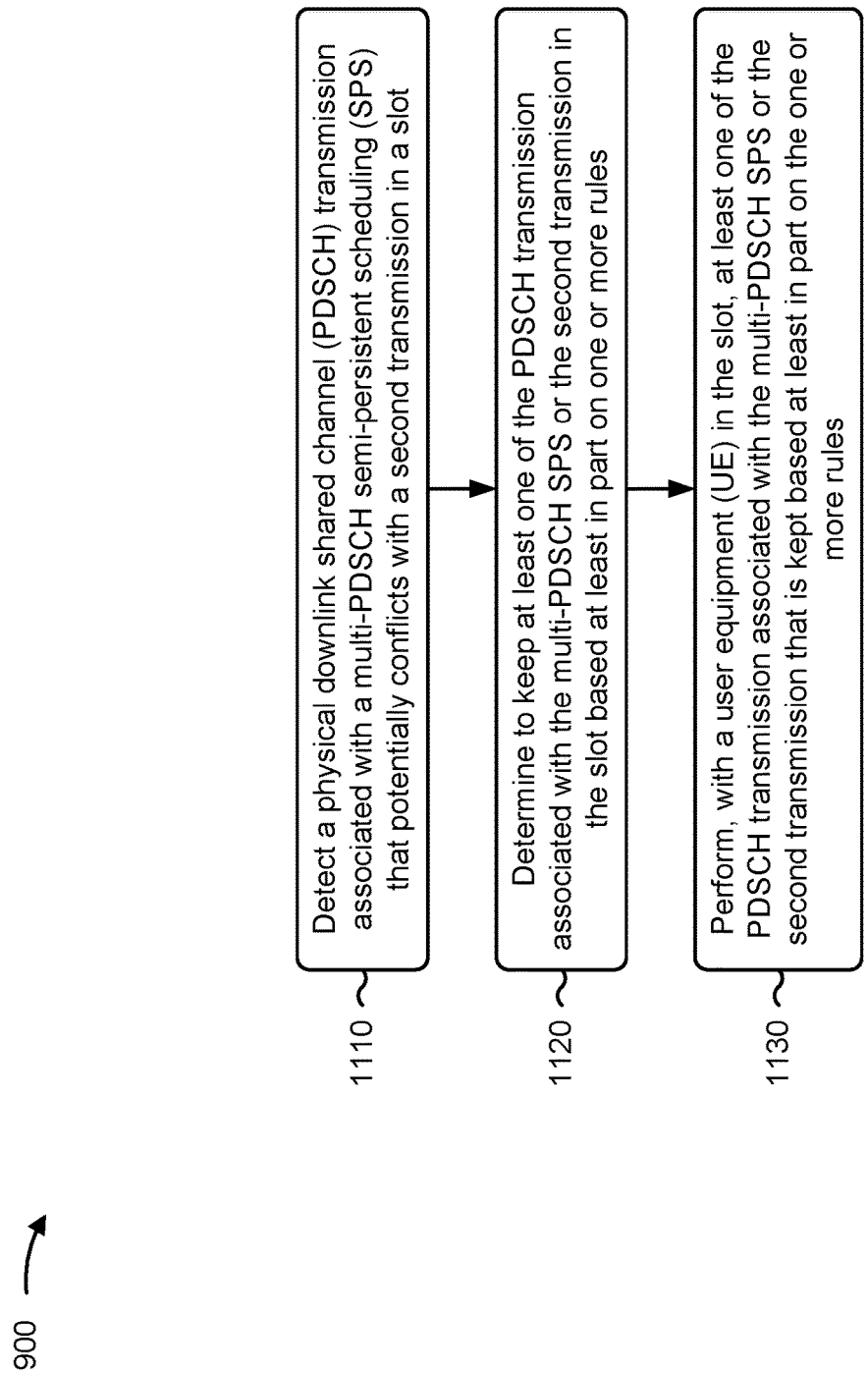
FIG. 11 is a diagram illustrating an example process associated with a potentially conflicting PDSCH transmission associated with a multi-PDSCH SPS, in accordance with the present disclosure.

FIG. 11 is a diagram illustrating an example process 1100 performed, for example, by a base station, in accordance with the present disclosure. Example process 1100 is an example where the base station (e.g., base station 110) performs operations associated with a potentially conflicting PDSCH transmission associated with a multi-PDSCH SPS.

As shown in FIG. 11, in some aspects, process 1100 may include detecting a PDSCH transmission associated with a multi-PDSCH SPS that potentially conflicts with a second transmission in a slot (block 1110). For example, the base station (e.g., using communication manager 150 and/or detection component 1208, depicted in FIG. 12) may detect a PDSCH transmission associated with a multi-PDSCH SPS that potentially conflicts with a second transmission in a slot, as described above.

As further shown in FIG. 11, in some aspects, process 1100 may include determining to keep at least one of the PDSCH transmission associated with the multi-PDSCH SPS or the second transmission in the slot based at least in part on one or more rules (block 1120). For example, the base station (e.g., using communication manager 150 and/or determination component 1210, depicted in FIG. 12) may determine to keep at least one of the PDSCH transmission associated with the multi-PDSCH SPS or the second transmission in the slot based at least in part on one or more rules, as described above.

As further shown in FIG. 11, in some aspects, process 1100 may include performing, with a base station in the slot, at least one of the PDSCH transmission associated with the multi-PDSCH SPS or the second transmission that is kept based at least in part on the one or more rules (block 1130). For example, the base station (e.g., using communication manager 150 and/or reception component 1202 or transmission component 1204, depicted in FIG. 12) may perform, with a base station in the slot, at least one of the PDSCH transmission associated with the multi-PDSCH SPS or the second transmission that is kept based at least in part on the one or more rules, as described above.

Process 1100 may include additional aspects, such as any single aspect or any combination of aspects described below and/or in connection with one or more other processes described elsewhere herein.

In a first aspect, detecting the PDSCH transmission that potentially conflicts with the second transmission is based at least in part on one or more of an overlapping in time between the PDSCH transmission and the second transmission, a time gap for TCI switching between the PDSCH transmission and the second transmission that does not satisfy a threshold, or a UE capability of receiving one or more PDSCH transmissions in a single slot.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
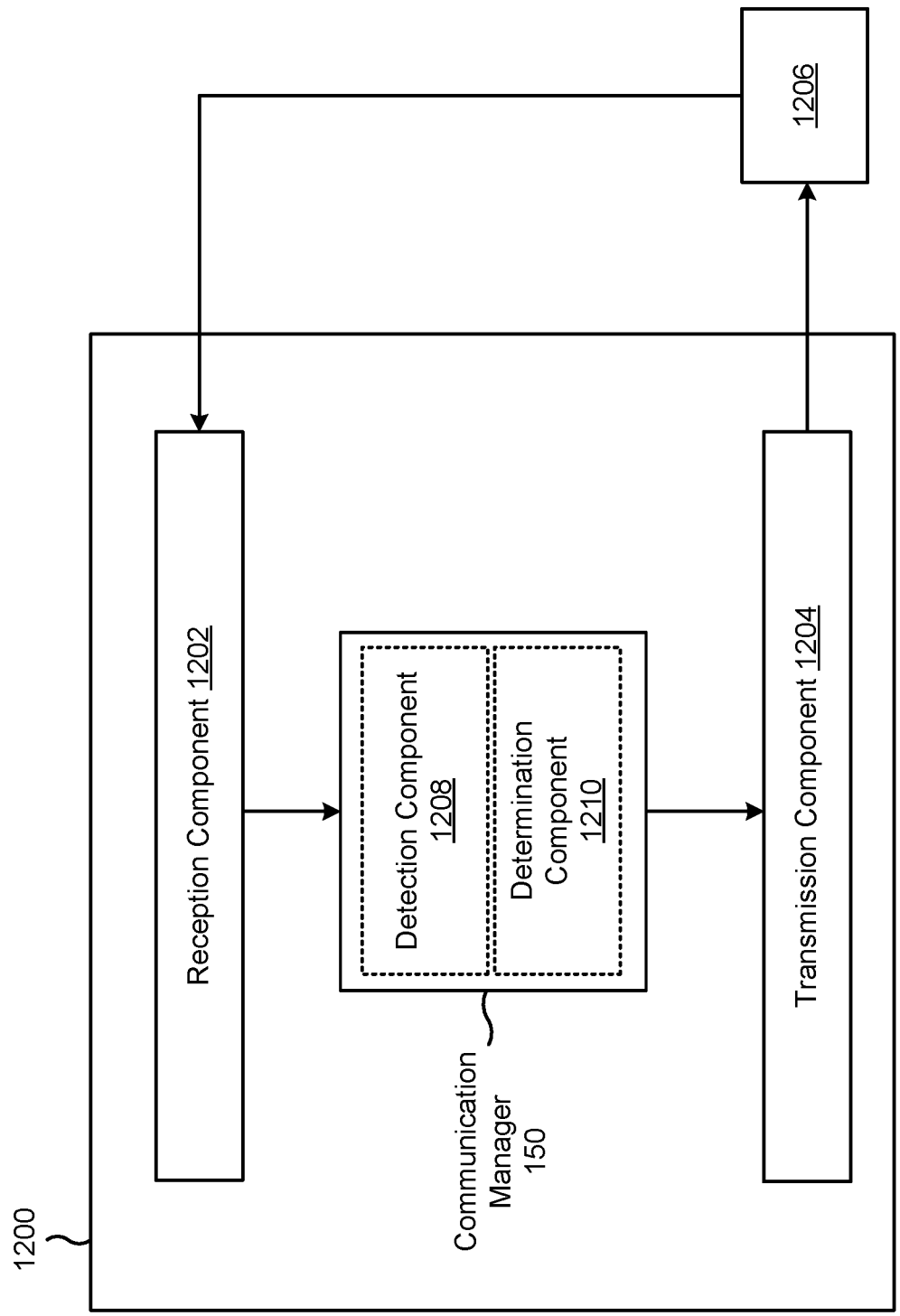
FIG. 12 is a diagram of an example apparatus for wireless communication, in accordance with the present disclosure.

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of a detection component 1208, or a determination component 1210, among other examples.

In some aspects, the apparatus 1200 may be configured to perform one or more operations described herein in connection with FIGS. 5-8. Additionally, or alternatively, the apparatus 1200 may be configured to perform one or more processes described herein, such as process 1100 of FIG. 11. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The detection component 1208 may detect a PDSCH transmission associated with a multi-PDSCH SPS that potentially conflicts with a second transmission in a slot. The determination component 1210 may determine to keep at least one of the PDSCH transmission associated with the multi-PDSCH SPS or the second transmission in the slot based at least in part on one or more rules. The reception component 1202 or the transmission component 1204 may perform, with a base station in the slot, at least one of the PDSCH transmission associated with the multi-PDSCH SPS or the second transmission that is kept based at least in part on the one or more rules.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: detecting a physical downlink shared channel (PDSCH) transmission associated with a multi-PDSCH semi-persistent scheduling (SPS) that potentially conflicts with a second transmission in a slot; determining to keep at least one of the PDSCH transmission associated with the multi-PDSCH SPS or the second transmission in the slot based at least in part on one or more rules; and performing, with a base station in the slot, at least one of the PDSCH transmission associated with the multi-PDSCH SPS or the second transmission that is kept based at least in part on the one or more rules.

Aspect 2: The method of Aspect 1, wherein detecting the PDSCH transmission that potentially conflicts with the second transmission is based at least in part on one or more of: an overlapping in time between the PDSCH transmission and the second transmission, a time gap for transmission configuration indicator (TCI) switching between the PDSCH transmission and the second transmission that does not satisfy a threshold, or a UE capability of receiving one or more PDSCH transmissions in a single slot.

Aspect 3: The method of any of Aspects 1 through 2, wherein the PDSCH transmission is a first PDSCH transmission, the multi-PDSCH SPS is a first multi-PDSCH SPS, the second transmission is a second PDSCH transmission associated with a second multi-PDSCH SPS, the first PDSCH transmission is one of multiple PDSCH transmissions of a first burst within a first configured period associated with the first multi-PDSCH SPS, and the second PDSCH transmission is one of multiple PDSCH transmissions of a second burst within a second configured period associated with the second multi-PDSCH SPS.

Aspect 4: The method of Aspect 3, wherein determining to keep at least one of the first PDSCH transmission or the second PDSCH transmission is based at least in part on a lowest SPS configuration index between the first multi-PDSCH SPS and the second multi-PDSCH SPS.

Aspect 5: The method of Aspect 3, wherein determining to keep at least one of the first PDSCH transmission or the second PDSCH transmission is based at least in part on a first start and length indicator value (SLIV) associated with the first PDSCH transmission, a second SLIV associated with the second PDSCH transmission, and a transmission configuration indicator (TCI) switching delay associated with the first multi-PDSCH SPS or the second multi-PDSCH SPS.

Aspect 6: The method of Aspect 3, wherein determining to keep at least one of the first PDSCH transmission or the second PDSCH transmission is based at least in part on a largest quantity of scheduled PDSCHs between the first burst of the first multi-PDSCH SPS and the second burst of the second multi-PDSCH SPS.

Aspect 7: The method of Aspect 3, wherein determining to keep at least one of the first PDSCH transmission or the second PDSCH transmission is based at least in part on an earliest start between an earliest PDSCH transmission within the first burst of the first multi-PDSCH SPS and an earliest PDSCH transmission within the second burst of the second multi-PDSCH SPS.

Aspect 8: The method of Aspect 3, wherein determining to keep at least one of the first PDSCH transmission or the second PDSCH transmission is based at least in part on an earliest end between the first burst of the first multi-PDSCH SPS and the second burst of the second multi-PDSCH SPS.

Aspect 9: The method of Aspect 3, wherein determining to keep at least one of the first PDSCH transmission or the second PDSCH transmission comprises keeping both the first PDSCH transmission and the second PDSCH transmission based at least in part on a first start and length indicator value (SLIV) associated with the first PDSCH transmission not overlapping with a second SLIV associated with the second PDSCH transmission, and based at least in part on a UE capability of receiving one or more PDSCH transmissions in a single slot.

Aspect 10: The method of Aspect 3, wherein determining to keep at least one of the first PDSCH transmission or the second PDSCH transmission is based at least in part on a random selection between the first multi-PDSCH SPS and the second multi-PDSCH SPS.

Aspect 11: The method of Aspect 3, wherein determining to keep at least one of the first PDSCH transmission or the second PDSCH transmission is based at least in part on a detection of a previous PDSCH transmission within the first burst associated with the first multi-PDSCH SPS or within the second burst associated with the second multi-PDSCH SPS.

Aspect 12: The method of Aspect 3, wherein determining to keep at least one of the first PDSCH transmission or the second PDSCH transmission comprises keeping the first PDSCH transmission associated with the first multi-PDSCH SPS and dropping the second PDSCH transmission associated with the second multi-PDSCH SPS based at least in part on the first PDSCH transmission having a higher priority than the second PDSCH transmission.

Aspect 13: The method of Aspect 12, further comprising keeping PDSCH transmissions subsequent to the second PDSCH transmission of the second burst associated with the second multi-PDSCH SPS.

Aspect 14: The method of Aspect 12, further comprising canceling PDSCH transmissions subsequent to the second PDSCH transmission of the second burst associated with the second multi-PDSCH SPS.

Aspect 15: The method of any of Aspects 1 through 14, wherein the second transmission in the slot is a dynamically scheduled PDSCH transmission.

Aspect 16: The method of Aspect 15, further comprising: keeping the dynamically scheduled PDSCH transmission and dropping the PDSCH transmission; and keeping PDSCH transmissions subsequent to the PDSCH transmission associated with the multi-PDSCH SPS.

Aspect 17: The method of Aspect 15, further comprising: keeping the dynamically scheduled PDSCH transmission; and dropping the PDSCH transmission and dropping PDSCH transmissions subsequent to the PDSCH transmission that are associated with the multi-PDSCH SPS.

Aspect 18: The method of Aspect 15, wherein determining to keep at least one of the PDSCH transmission or the dynamically scheduled PDSCH transmission comprises keeping both the PDSCH transmission and the dynamically scheduled PDSCH transmission based at least in part on a first start and length indicator value (SLIV) associated with the PDSCH transmission not overlapping with a second SLIV associated with the dynamically scheduled PDSCH transmission, and based at least in part on a UE capability of receiving one or more PDSCH transmissions in a single slot.

Aspect 19: The method of any of Aspects 1 through 18, wherein the second transmission in the slot corresponds to static uplink symbols for a potential uplink transmission, and wherein determining to keep one of the PDSCH transmission or the static uplink symbols for the potential uplink transmission comprises dropping the PDSCH transmission.

Aspect 20: A method of wireless communication performed by a base station, comprising: detecting a physical downlink shared channel (PDSCH) transmission associated with a multi-PDSCH semi-persistent scheduling (SPS) that potentially conflicts with a second transmission in a slot; determining to keep at least one of the PDSCH transmission associated with the multi-PDSCH SPS or the second transmission in the slot based at least in part on one or more rules; and performing, with a base station in the slot, at least one of the PDSCH transmission associated with the multi-PDSCH SPS or the second transmission that is kept based at least in part on the one or more rules.

Aspect 21: The method of Aspect 20, wherein detecting the PDSCH transmission that potentially conflicts with the second transmission is based at least in part on one or more of: an overlapping in time between the PDSCH transmission and the second transmission, a time gap for transmission configuration indicator (TCI) switching between the PDSCH transmission and the second transmission that does not satisfy a threshold, or a UE capability of receiving one or more PDSCH transmissions in a single slot.

Aspect 22: An apparatus for wireless communication at a device, comprising a processor; memory coupled with the processor; and instructions stored in the memory and executable by the processor to cause the apparatus to perform the method of one or more of Aspects 1-19.

Aspect 23: A device for wireless communication, comprising a memory and one or more processors coupled to the memory, the one or more processors configured to perform the method of one or more of Aspects 1-19.

Aspect 24: An apparatus for wireless communication, comprising at least one means for performing the method of one or more of Aspects 1-19.

Aspect 25: A non-transitory computer-readable medium storing code for wireless communication, the code comprising instructions executable by a processor to perform the method of one or more of Aspects 1-19.

Aspect 26: A non-transitory computer-readable medium storing a set of instructions for wireless communication, the set of instructions comprising one or more instructions that, when executed by one or more processors of a device, cause the device to perform the method of one or more of Aspects 1-19.

Aspect 27: An apparatus for wireless communication at a device, comprising a processor; memory coupled with the processor; and instructions stored in the memory and executable by the processor to cause the apparatus to perform the method of one or more of Aspects 20-21.

Aspect 28: A device for wireless communication, comprising a memory and one or more processors coupled to the memory, the one or more processors configured to perform the method of one or more of Aspects 20-21.

Aspect 29: An apparatus for wireless communication, comprising at least one means for performing the method of one or more of Aspects 20-21.

Aspect 30: A non-transitory computer-readable medium storing code for wireless communication, the code comprising instructions executable by a processor to perform the method of one or more of Aspects 20-21.

Aspect 31: A non-transitory computer-readable medium storing a set of instructions for wireless communication, the set of instructions comprising one or more instructions that, when executed by one or more processors of a device, cause the device to perform the method of one or more of Aspects 20-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
   detect a physical downlink shared channel (PDSCH) transmission associated with a first multi-PDSCH semi-persistent scheduling (SPS) that potentially conflicts with a second transmission in a slot;
   determine to keep at least one of the PDSCH transmission or the second transmission in the slot based at least in part on the PDSCH transmission potentially conflicting with the second transmission and based at least in part on one or more rules,
   wherein the one or more rules include one or more of:
      a rule to keep either the PDSCH transmission or the second transmission that is associated with a largest quantity of scheduled PDSCHs between a first burst, of the first multi-PDSCH SPS, and a second burst of a second multi-PDSCH SPS associated with the second transmission, or
      a rule associated with a detection of a previous PDSCH transmission within the first burst or the previous PDSCH transmission within the second burst; and
   perform, with a base station in the slot, the at least one of the PDSCH transmission or the second transmission that is kept.

2. The apparatus of claim 1, wherein the one or more processors, to detect the PDSCH transmission that potentially conflicts with the second transmission, are configured to:
   detect the PDSCH transmission that potentially conflicts with the second transmission based at least in part on one or more of: an overlapping in time between the PDSCH transmission and the second transmission, a time gap for transmission configuration indicator (TCI) switching between the PDSCH transmission and the second transmission that does not satisfy a threshold, or a UE capability of receiving one or more PDSCH transmissions in a single slot.

3. The apparatus of claim 1, wherein the PDSCH transmission is a first PDSCH transmission, the second transmission is a second PDSCH transmission associated with the second multi-PDSCH SPS, the first PDSCH transmission is one of multiple PDSCH transmissions of the first burst within a first configured period associated with the first multi-PDSCH SPS, and the second PDSCH transmission is one of multiple PDSCH transmissions of the second burst within a second configured period associated with the second multi-PDSCH SPS.

4. The apparatus of claim 1, wherein the one or more rules further include a rule associated with a lowest SPS configuration index between the first multi-PDSCH SPS and the second multi-PDSCH SPS.

5. The apparatus of claim 3, wherein the one or more rules further include a rule associated with a first start and length indicator value (SLIV) associated with the first PDSCH transmission, a second SLIV associated with the second PDSCH transmission, and a transmission configuration indicator (TCI) switching delay associated with the first multi-PDSCH SPS or the second multi-PDSCH SPS.

6. The apparatus of claim 1, wherein the one or more rules further include a rule associated with an earliest start between an earliest PDSCH transmission within the first burst and an earliest PDSCH transmission within the second burst.

7. The apparatus of claim 1, wherein the one or more rules further include a rule associated with an earliest end between the first burst and the second burst.

8. The apparatus of claim 3, wherein the one or more rules further include a rule to keep both the first PDSCH transmission and the second PDSCH transmission based at least in part on a first start and length indicator value (SLIV) associated with the first PDSCH transmission not overlapping with a second SLIV associated with the second PDSCH transmission, and based at least in part on a UE capability of receiving one or more PDSCH transmissions in a single slot.

9. The apparatus of claim 1, wherein the one or more rules further include a rule associated with a random selection between the first multi-PDSCH SPS and the second multi-PDSCH SPS.

10. The apparatus of claim 3, wherein the one or more processors are configured to:
keep the first PDSCH transmission and drop the second PDSCH transmission based at least in part on the first PDSCH transmission having a higher priority than the second PDSCH transmission.

11. The apparatus of claim 10, wherein the one or more processors are further configured to keep PDSCH transmissions, subsequent to the second PDSCH transmission, of the second burst.

12. The apparatus of claim 10, wherein the one or more processors are further configured to cancel PDSCH transmissions, subsequent to the second PDSCH transmission, of the second burst.

13. The apparatus of claim 1, wherein the second transmission in the slot is a dynamically scheduled PDSCH transmission.

14. The apparatus of claim 13, wherein the one or more processors are further configured to:
keep the dynamically scheduled PDSCH transmission and drop the PDSCH transmission; and
keep PDSCH transmissions subsequent to the PDSCH transmission associated with the first multi-PDSCH SPS.

15. The apparatus of claim 13, wherein the one or more processors are further configured to:
keep the dynamically scheduled PDSCH transmission; and
drop the PDSCH transmission and drop PDSCH transmissions, subsequent to the PDSCH transmission, that are associated with the first multi-PDSCH SPS.

16. The apparatus of claim 13, wherein the one or more processors are configured to:
keep both the PDSCH transmission and the dynamically scheduled PDSCH transmission based at least in part on a first start and length indicator value (SLIV) associated with the PDSCH transmission not overlapping with a second SLIV associated with the dynamically scheduled PDSCH transmission, and based at least in part on a UE capability of receiving one or more PDSCH transmissions in a single slot.

17. The apparatus of claim 1, wherein the second transmission in the slot corresponds to static uplink symbols for a potential uplink transmission, and wherein the one or more processors, to determine to keep one of the PDSCH transmission or the static uplink symbols for the potential uplink transmission, are configured to drop the PDSCH transmission.

18. A method of wireless communication performed by a user equipment (UE), comprising:
detecting a physical downlink shared channel (PDSCH) transmission associated with a first multi-PDSCH semi-persistent scheduling (SPS) that potentially conflicts with a second transmission in a slot;
determining to keep at least one of the PDSCH transmission or the second transmission in the slot based at least in part on the PDSCH transmission potentially conflicting with the second transmission and based at least in part on one or more rules,
wherein the one or more rules include one or more of:
a rule to keep either the PDSCH transmission or the second transmission that is associated with a largest quantity of scheduled PDSCHs between a first burst, of the first multi-PDSCH SPS, and a second burst of a second multi-PDSCH SPS associated with the second transmission, or
a rule associated with a detection of a previous PDSCH transmission within the first burst or the previous PDSCH transmission within the second burst; and
performing, with a base station in the slot, the at least one of the PDSCH transmission or the second transmission that is kept.

19. The method of claim 18, wherein detecting the PDSCH transmission that potentially conflicts with the second transmission is based at least in part on one or more of: an overlapping in time between the PDSCH transmission and the second transmission, a time gap for transmission configuration indicator (TCI) switching between the PDSCH transmission and the second transmission that does not satisfy a threshold, or a UE capability of receiving one or more PDSCH transmissions in a single slot.

20. The method of claim 18, wherein the PDSCH transmission is a first PDSCH transmission, the second transmission is a second PDSCH transmission associated with the second multi-PDSCH SPS, the first PDSCH transmission is one of multiple PDSCH transmissions of the first burst within a first configured period associated with the first multi-PDSCH SPS, and the second PDSCH transmission is one of multiple PDSCH transmissions of the second burst within a second configured period associated with the second multi-PDSCH SPS.

21. The method of claim 20, wherein the one or more rules further include a rule associated with a first start and length indicator value (SLIV) associated with the first PDSCH transmission, a second SLIV associated with the second PDSCH transmission, and a transmission configuration indicator (TCI) switching delay associated with the first multi-PDSCH SPS or the second multi-PDSCH SPS.

22. The method of claim 20, wherein the one or more rules further include one or more of:
   a rule to keep at least one of the first PDSCH transmission or the second PDSCH transmission based at least in part on an earliest start between an earliest PDSCH transmission within the first burst and an earliest PDSCH transmission within the second burst;
   a rule to keep at least one of the first PDSCH transmission or the second PDSCH transmission based at least in part on an earliest end between the first burst and the second burst;
   a rule to keep both the first PDSCH transmission and the second PDSCH transmission based at least in part on a first start and length indicator value (SLIV) associated with the first PDSCH transmission not overlapping with a second SLIV associated with the second PDSCH transmission, and based at least in part on a UE capability of receiving one or more PDSCH transmissions in a single slot; or
   a rule to keep at least one of the first PDSCH transmission or the second PDSCH transmission based at least in part on a random selection between the first multi-PDSCH SPS and the second multi-PDSCH SPS.

23. The method of claim 18, wherein the second transmission in the slot is a dynamically scheduled PDSCH transmission.

24. The method of claim 23, wherein the one or more rules further include a rule to keep both the PDSCH transmission and the dynamically scheduled PDSCH transmission based at least in part on a first start and length indicator value (SLIV) associated with the PDSCH transmission not overlapping with a second SLIV associated with the dynamically scheduled PDSCH transmission, and based at least in part on a UE capability of receiving one or more PDSCH transmissions in a single slot.

25. An apparatus for wireless communication at a base station, comprising:
   one or more memories; and
   one or more processors, coupled to the one or more memories, configured to:
      detect a physical downlink shared channel (PDSCH) transmission associated with a first multi-PDSCH semi-persistent scheduling (SPS) that potentially conflicts with a second transmission in a slot;
      determine to keep at least one of the PDSCH transmission or the second transmission in the slot based at least in part on the PDSCH transmission potentially conflicting with the second transmission and based at least in part on one or more rules,
      wherein the one or more rules include one or more of:
         a rule to keep either the PDSCH transmission or the second transmission that is associated with a largest quantity of scheduled PDSCHs between a first burst, of the first multi-PDSCH SPS, and a second burst of a second multi-PDSCH SPS associated with the second transmission, or
         a rule associated with a detection of a previous PDSCH transmission within the first burst or the previous PDSCH transmission within the second burst; and
      perform, with a user equipment (UE) in the slot, the at least one of the PDSCH transmission or the second transmission that is kept.

26. The apparatus of claim 25, wherein the one or more processors, to detect the PDSCH transmission that potentially conflicts with the second transmission, are configured to:
   detect the PDSCH transmission that potentially conflicts with the second transmission based at least in part on one or more of: an overlapping in time between the PDSCH transmission and the second transmission, a time gap for transmission configuration indicator (TCI) switching between the PDSCH transmission and the second transmission that does not satisfy a threshold, or a UE capability of receiving one or more PDSCH transmissions in a single slot.

27. The apparatus of claim 25, wherein the PDSCH transmission is a first PDSCH transmission, the second transmission is a second PDSCH transmission associated with the second multi-PDSCH SPS, the first PDSCH transmission is one of multiple PDSCH transmissions of the first burst within a first configured period associated with the first multi-PDSCH SPS, and the second PDSCH transmission is one of multiple PDSCH transmissions of the second burst within a second configured period associated with the second multi-PDSCH SPS.

28. The apparatus of claim 27, wherein the one or more rules further include a rules associated with a first start and length indicator value (SLIV) associated with the first PDSCH transmission, a second SLIV associated with the second PDSCH transmission, and a transmission configuration indicator (TCI) switching delay associated with the first multi-PDSCH SPS or the second multi-PDSCH SPS.

29. A method of wireless communication performed by a base station, comprising:
   detecting a physical downlink shared channel (PDSCH) transmission associated with a first multi-PDSCH semi-persistent scheduling (SPS) that potentially conflicts with a second transmission in a slot;
   determining to keep at least one of the PDSCH transmission or the second transmission in the slot based at least in part on the PDSCH transmission potentially conflicting with the second transmission and based at least in part on one or more rules,
      wherein the one or more rules include one or more of:
         a rule to keep either the PDSCH transmission or the second transmission that is associated with a largest quantity of scheduled PDSCHs between a first burst, of the first multi-PDSCH SPS, and a second burst of a second multi-PDSCH SPS associated with the second transmission, or
         a rule associated with a detection of a previous PDSCH transmission within the first burst or the previous PDSCH transmission within the second burst; and
   performing, with a user equipment (UE) in the slot, the at least one of the PDSCH transmission or the second transmission that is kept.

30. The method of claim 29, wherein detecting the PDSCH transmission that potentially conflicts with the second transmission is based at least in part on one or more of: an overlapping in time between the PDSCH transmission and the second transmission, a time gap for transmission configuration indicator (TCI) switching between the PDSCH transmission and the second transmission that does not satisfy a threshold, or a UE capability of receiving one or more PDSCH transmissions in a single slot.

* * * * *